US010530607B2

(12) United States Patent
Finn

(10) Patent No.: US 10,530,607 B2
(45) Date of Patent: *Jan. 7, 2020

(54) MULTI-BRIDGE LAN AGGREGATION

(71) Applicant: Cisco Systems, Inc., San Jose, CA (US)

(72) Inventor: Norman W. Finn, Livermore, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/699,802

(22) Filed: Apr. 29, 2015

(65) Prior Publication Data
US 2015/0244542 A1  Aug. 27, 2015

Related U.S. Application Data

(63) Continuation of application No. 13/285,985, filed on Oct. 31, 2011, which is a continuation of application No. 10/282,438, filed on Oct. 29, 2002, now Pat. No. 8,051,211.

(51) Int. Cl.
H04L 12/28 (2006.01)
H04L 12/46 (2006.01)
H04L 12/709 (2013.01)
H04L 12/937 (2013.01)
H04L 12/931 (2013.01)
H04J 1/16 (2006.01)

(52) U.S. Cl.
CPC ...... H04L 12/4625 (2013.01); H04L 12/4645 (2013.01); H04L 45/245 (2013.01); H04L 49/253 (2013.01); H04L 49/354 (2013.01)

(58) Field of Classification Search
USPC ................. 370/389, 401, 419, 463
See application file for complete search history.

(56) References Cited

U.S. PATENT DOCUMENTS

| 3,602,899 | A | 8/1971 | Lindquist et al. |
| 5,404,525 | A | 4/1995 | Endicott et al. |
| 5,414,704 | A | 5/1995 | Spinney |
| 5,467,349 | A | 11/1995 | Huey et al. |
| 5,841,874 | A | 11/1998 | Kempke et al. |
| 5,848,233 | A | 12/1998 | Radia et al. |

(Continued)

FOREIGN PATENT DOCUMENTS

EP  1033844 A2  9/2000

OTHER PUBLICATIONS

Declaration of Dr. Bill Lin dated Mar. 30, 2015, submitted in connection with Inter Partes review proceedings before the U.S. Patent and Trademark Office for U.S. Pat. No. 8,051,211, 58 pgs.

(Continued)

Primary Examiner — John Pezzlo
(74) Attorney, Agent, or Firm — Campbell Stephenson LLP

(57) ABSTRACT

A method and system for multi-bridge LAN aggregation is disclosed. The method includes aggregating a plurality of LANs coupling a host to a first and a second intermediate network device. The system includes an intermediate network device. The intermediate network device includes a multi-bridge engine. The multi-bridge engine includes a tunnel engine coupled to a bridge interconnect port and a first physical port.

20 Claims, 9 Drawing Sheets

(56) References Cited

U.S. PATENT DOCUMENTS

| | | | |
|---|---|---|---|
| 5,920,886 A | 7/1999 | Feldmeier | |
| 5,938,736 A | 8/1999 | Muller et al. | |
| 6,064,671 A | 5/2000 | Killian | 370/389 |
| 6,081,522 A | 6/2000 | Hendel et al. | |
| 6,195,351 B1 | 2/2001 | Hiscock et al. | 370/389 |
| 6,209,023 B1* | 3/2001 | Dimitroff | G06F 3/0607 709/211 |
| 6,229,787 B1 | 5/2001 | Byrne | 370/218 |
| 6,233,232 B1 | 5/2001 | Chau et al. | 370/352 |
| 6,259,699 B1 | 7/2001 | Opalka | |
| 6,335,932 B2 | 1/2002 | Kadambi | 370/391 |
| 6,377,577 B1 | 4/2002 | Bechtolsheim et al. | |
| 6,608,812 B1 | 8/2003 | Wils et al. | 370/217 |
| 6,633,835 B1 | 10/2003 | Moran | 702/181 |
| 6,657,951 B1 | 12/2003 | Carroll et al. | 370/222 |
| 6,738,862 B1 | 5/2004 | Ross et al. | |
| 6,850,976 B1 | 2/2005 | Xia | 709/224 |
| 6,910,149 B2 | 6/2005 | Perloff et al. | 714/4 |
| 6,931,529 B2 | 8/2005 | Kunzinger | 713/153 |
| 6,959,332 B1 | 10/2005 | Zavalkovsky | 709/223 |
| 6,963,575 B1* | 11/2005 | Sistanizadeh | H04L 12/4625 370/401 |
| 6,978,308 B2 | 12/2005 | Boden et al. | 709/229 |
| 6,996,628 B2 | 2/2006 | Keane et al. | 709/238 |
| 7,010,607 B1* | 3/2006 | Bunton | H04L 1/18 709/228 |
| 7,023,853 B1 | 4/2006 | Bechtolsheim et al. | |
| 7,027,412 B2 | 4/2006 | Miyamoto et al. | 370/255 |
| 7,028,333 B2 | 4/2006 | Tuomenoksa et al. | 726/3 |
| 7,028,334 B2 | 4/2006 | Tuomenoksa et al. | 726/3 |
| 7,028,337 B2 | 4/2006 | Murakawa | 726/15 |
| 7,209,435 B1 | 4/2007 | Kuo et al. | 370/219 |
| 7,466,697 B1 | 12/2008 | Raz | 370/389 |
| 7,583,665 B1* | 9/2009 | Duncan | H04Q 11/0478 370/389 |
| 7,586,899 B1 | 9/2009 | Mohaban | 370/352 |
| 7,647,422 B2 | 1/2010 | Singh et al. | 709/238 |
| 8,051,211 B2 | 11/2011 | Finn | |
| 8,462,668 B2 | 6/2013 | Kuo | |
| 2002/0078382 A1 | 6/2002 | Sheikh et al. | |
| 2002/0091795 A1 | 7/2002 | Yip | 709/218 |
| 2002/0131437 A1 | 9/2002 | Tagore-Brage | 370/419 |
| 2002/0165972 A1* | 11/2002 | Chien | H04L 12/2856 709/229 |
| 2003/0026209 A1* | 2/2003 | Katz | H04L 12/42 370/238 |
| 2003/0037162 A1* | 2/2003 | Kotser | H04L 12/462 709/236 |
| 2003/0048746 A1 | 3/2003 | Guess et al. | 370/219 |
| 2003/0067928 A1* | 4/2003 | Gonda | H04L 12/4641 370/401 |
| 2003/0126233 A1 | 7/2003 | Bryers et al. | 709/219 |
| 2003/0147405 A1* | 8/2003 | Khill | H04L 12/4625 370/401 |
| 2003/0217177 A1* | 11/2003 | Gulati | H04L 49/252 709/238 |
| 2004/0037279 A1* | 2/2004 | Zelig | H04L 12/1836 370/390 |
| 2005/0030061 A1* | 2/2005 | Ingino | H03K 19/018557 326/30 |
| 2010/0103837 A1* | 4/2010 | Jungck | H04L 29/12066 370/252 |
| 2010/0241595 A1* | 9/2010 | Felsher | G06F 19/322 705/400 |
| 2018/0069668 A1 | 3/2018 | Jorgensen | |

OTHER PUBLICATIONS

Network Working Group, RFC 2401, Security Architecture for Internet Protocol, Standards Track, Nov. 1998, 66 pgs.

Arista White Paper, Arista Cloud Networks, Exhibit 2001 in IPR2015-00975, 10 pgs.

Oxford Pocket American Dictionary of Current English (excerpt), Exhibit 2002 in IPR2015-00975, 3 pgs.

LAN Aggregation Through Switch Meshing, Hewlett Packard, Jun. 1998, pp. 1-12, http://www.hp.com/rnd/library/pdf/techlib.sub.--meshing.pdf.

Amendment to Carrier Sense Multiple Access with Collision Detection (CSMA/CD) Access Method and Physical Layer Specifications—Aggregation of Multiple Link Segments, LAN MAN Standards Committee of the IEEE Computer Society, Mar. 30, 2000, pp. i-ix and 1-173, IEEE Std 802.3ad-2000.

Dynamic LACP Trunking, Hewlett Packard, 2000, pp. 1-6, http://www.hp.com/rnd/support/config.sub.--examples/2524.sub.--lacp.pdf.

Software Configuration Guide—Release 5.2, Configuring Fast EtherChannel and Gigabit EtherChannel, Software Configuration Guide, Cisco Systems, Jun. 27, 2002, pp. 7-1-7-16, http://www.cisco.com/univercd/cc/td/doc/product/lan/cat5000/rel.sub.--5.s-ub.--2/config/channel.pdf.

Software Configuration Guide—Release 5.2, Configuring VLAN Trunks on Fast Ethernet and Gigabit Ethernet Ports, Cisco Systems, Jun. 27, 2002, pp. 12-1-12-28, http://www.cisco.com/univercd/cc/td/doc/product/lan/cat5000/rel.sub.--5.s- ub.--2/config/e.sub.--.

Decision, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 17 pgs.

Decision, Institution of Inter Partes Review Before the Patent Trial and Appeal Board, Case No. IPR2015-00978, *Arista Networks, Inc.* v. *Cisco Systems, Inc.* regarding U.S. Pat. No. 7,340,597, 17 pgs.

In the Matter of Certain Network Devices, Related Software and Components Thereof (II), Investigation No. 337-TA-945 Before the U.S. International Trade Commission, Doc ID No. 548117—Complaint of Cisco Systems, Inc. Under Section 337 of the Tariff Act of 1930, As Amended (with Exhibits and Appendices), 57 Pgs.

In the Matter of Certain Network Devices, Related Software and Components Thereof (II), Investigation No. 337-TA-945 Before the U.S. International Trade Commission, Doc ID No. 548231—Notice of Receipt of Complaint; Solicitation of Comments Relating to the Public Interest, 3 Pgs.

In the Matter of Certain Network Devices, Related Software and Components Thereof (II), Investigation No. 337-TA-945 Before the U.S. International Trade Commission, Doc ID No. 548296—Letter dated Jan. 6, 2015 regarding Public Versions of Confidential Exhibits, 1 Pg.

In the Matter of Certain Network Devices, Related Software and Components Thereof (II), Investigation No. 337-TA-945 Before the U.S. International Trade Commission, Doc ID No. 548828—Letter dated Jan. 6, 2015 regarding Institution of Investigations, 6 Pgs.

In the Matter of Certain Network Devices, Related Software and Components Thereof (II), Investigation No. 337-TA-945 Before the U.S. International Trade Commission, Doc ID No. 548829—Proposed Respondent Arista Networks Inc.'s Public Interest Statement Pursuant to 19 CFR 210.14(f), 8 Pgs.

In the Matter of Certain Network Devices, Related Software and Components Thereof (II), Investigation No. 337-TA-945 Before the U.S. International Trade Commission, Doc ID No. 548843—Federal Register Notices dated Dec. 30, 2014, Notice of Receipt of Complaint; Solicitation of Comments Relating to the Public Interest, 2 Pgs.

In the Matter of Certain Network Devices, Related Software and Components Thereof (II), Investigation No. 337-TA-945 Before the U.S. International Trade Commission, Doc ID No. 549097—Letter dated Jan. 9, 2015 regarding Institution of Investigations, 5 Pgs.

In the Matter of Certain Network Devices, Related Software and Components Thereof (II), Investigation No. 337-TA-945 Before the U.S. International Trade Commission, Doc ID No. 549111, Reply of Cisco Systems, Inc. to Proposed Respondent Arista Networks, Inc.'s Public Interest Statement Pursuant to 19 C.F.R. 210.14(f), 7 Pgs.

In the Matter of Certain Network Devices, Related Software and Components Thereof (II), Investigation No. 337-TA-945 Before the U.S. International Trade Commission, Doc ID No. 549663—Notice of Institution of Investigation, 13 Pgs.

In the Matter of Certain Network Devices, Related Software and Components Thereof (II), Investigation No. 337-TA-945 Before the

(56) References Cited

OTHER PUBLICATIONS

U.S. International Trade Commission, Doc ID No. 549872—Arista Networks, Inc.'s Motion to Consolidate Investigations, 20 Pgs.
In the Matter of Certain Network Devices, Related Software and Components Thereof (II), Investigation No. 337-TA-945 Before the U.S. International Trade Commission, Doc ID No. 550162—Federal Register Notices dated Jan. 27, 2015—Notice of Institution of Investigation, 2 Pgs.
In the Matter of Certain Network Devices, Related Software and Components Thereof (II), Investigation No. 337-TA-945 Before the U.S. International Trade Commission, Doc ID No. 550889—Cisco Systems, Inc.'s Memorandum of Law in Support of its Response to Arista Networks Inc.'s Motion to Consolidate Investigations, 18 Pgs.
In the Matter of Certain Network Devices, Related Software and Components Thereof (II), Investigation No. 337-TA-945 Before the U.S. International Trade Commission, Doc ID No. 550894—Commission Investigative Staff's Response to Arista Networks, Inc.'s Motion to Consolidate Investigations, 7 Pgs.
In the Matter of Certain Network Devices, Related Software and Components Thereof (II), Investigation No. 337-TA-945 Before the U.S. International Trade Commission, Doc ID No. 550957—Order No. 3 Denying Respondent's Motion to Consolidate Investigations dated Feb. 5, 2015, 4 Pgs.
In the Matter of Certain Network Devices, Related Software and Components Thereof (II), Investigation No. 337-TA-945 Before the U.S. International Trade Commission, Doc ID No. 551299—Respondent Arista Networks, Inc.'s Motion for an Extended Target Date, 13 Pgs.
In the Matter of Certain Network Devices, Related Software and Components Thereof (II), Investigation No. 337-TA-945 Before the U.S. International Trade Commission, Doc ID No. 551422—Response of Arista Networks Inc. to the Notice of Investigation and Complaint of Cisco Systems, Inc. Under Section 337 of the Tariff Act of 1930, As Amended, 47 Pgs.
In the Matter of Certain Network Devices, Related Software and Components Thereof (II), Investigation No. 337-TA-945 Before the U.S. International Trade Commission, Doc ID No. 551489—Commission Investigative Staff's Response to Arista Networks, Inc.'s Motion for an Extended Target Date, Feb. 12, 2015, 6 Pgs.
In the Matter of Certain Network Devices, Related Software and Components Thereof (II), Investigation No. 337-TA-945 Before the U.S. International Trade Commission, Doc ID No. 551491—Cisco Systems, Inc.'s Memorandum of Law in Support of its Response to Arista Networks Inc.'s Motion for an Extended Target Date, Feb. 12, 2015, 17 Pgs.
In the Matter of Certain Network Devices, Related Software and Components Thereof (II), Investigation No. 337-TA-945 Before the U.S. International Trade Commission, Doc ID No. 553573—Commission Investigative Staff's Statement Regarding Identification of Expert Witnesses, Mar. 20, 2015, 2 Pgs.
In the Matter of Certain Network Devices, Related Software and Components Thereof (II), Investigation No. 337-TA-945 Before the U.S. International Trade Commission, Doc ID No. 553593—Complainant Cisco Systems, Inc.'s Identification of Expert Witnesses, Mar. 20, 2015, 265 Pgs.
In the Matter of Certain Network Devices, Related Software and Components Thereof (II), Investigation No. 337-TA-945 Before the U.S. International Trade Commission, Doc ID No. 553603—Arista Networks, Inc.'s Identification of Expert Witnesses, Mar. 20, 2015, 227 Pgs.
In the Matter of Certain Network Devices, Related Software and Components Thereof (II), Investigation No. 337-TA-945 Before the U.S. International Trade Commission, Doc ID No. 555123—Joint Claim Construction Chart, Apr. 14, 2015, 83 Pgs.
In the Matter of Certain Network Devices, Related Software and Components Thereof (II), Investigation No. 337-TA-945 Before the U.S. International Trade Commission, Doc ID No. 556712—Joint Report Regarding Streamlining the Issues to be Decided in the Investigation, May 7, 2015, 10 Pgs.
In the Matter of Certain Network Devices, Related Software and Components Thereof (II), Investigation No. 337-TA-945 Before the U.S. International Trade Commission, Doc ID No. 556818—Order No. 11 Ordering Further Meet and Confer, May 11, 2015, 3 Pgs.
In the Matter of Certain Network Devices, Related Software and Components Thereof (II), Investigation No. 337-TA-945 Before the U.S. International Trade Commission, Doc ID No. 557219—Complainant Cisco Systems, Inc.'s Opening Claim Construction Brief May 15, 2015, 71 Pgs.
In the Matter of Certain Network Devices, Related Software and Components Thereof (II), Investigation No. 337-TA-945 Before the U.S. International Trade Commission, Doc ID No. 557224—Arista's Initial Claim Construction Brief May 15, 2015, 65 Pgs.
In the Matter of Certain Network Devices, Related Software and Components Thereof (II), Investigation No. 337-TA-945 Before the U.S. International Trade Commission, Doc ID No. 557529—Second Joint Report Regarding Streamlining the Issues to be Decided in the Investigation, May 21, 2015, 6 Pgs.
In the Matter of Certain Network Devices, Related Software and Components Thereof (II), Investigation No. 337-TA-945 Before the U.S. International Trade Commission, Doc ID No. 557605—The Commission Investigative Staff's Initial Claim Construction Brief May 22, 2015, 64 Pgs.
In the Matter of Certain Network Devices, Related Software and Components Thereof (II), Investigation No. 337-TA-945 Before the U.S. International Trade Commission, Doc ID No. 557723—Complainant Cisco Systems, Inc.'s Identification of the Qualifications of a Person of Ordinary Skill in the Art, May 27, 2015, 5 Pgs.
In the Matter of Certain Network Devices, Related Software and Components Thereof (II), Investigation No. 337-TA-945 Before the U.S. International Trade Commission, Doc ID No. 557724—The Commission Investigative Staff's Identification of the Qualifications of a Person of Ordinary Skill in the Art for the Asserted Patents, May 27, 2015, 3 Pgs.
In the Matter of Certain Network Devices, Related Software and Components Thereof (II), Investigation No. 337-TA-945 Before the U.S. International Trade Commission, Doc Id No. 557734—Arista's Supplemental Submission on the Level of Skill for a Person of Ordinary Skill in the Art, May 27, 2015, 4 Pgs.
In the Matter of Certain Network Devices, Related Software and Components Thereof (II), Investigation No. 337-TA-945 Before the U.S. International Trade Commission, Doc ID No. 557955—The Commission Investigative Staff's Reply Brief Regarding Claim Construction, May 29, 2015, 20 Pgs.
In the Matter of Certain Network Devices, Related Software and Components Thereof (II), Investigation No. 337-TA-945 Before the U.S. International Trade Commission, Doc ID No. 557972—Arista's Reply Claim Construction Brief May 29, 2015, 154 Pgs.
In the Matter of Certain Network Devices, Related Software and Components Thereof (II), Investigation No. 337-TA-945 Before the U.S. International Trade Commission, Doc ID No. 557975—Complainant Cisco Systems, Inc.'s Reply Claim Construction Brief May 29, 2015, 56 Pgs.
In the Matter of Certain Network Devices, Related Software and Components Thereof (II), Investigation No. 337-TA-945 Before the U.S. International Trade Commission, Doc ID No. 558577—Joint Claim Construction Chart for Disputed Terms to be Considered at the Markman Hearing and Agreed Terms, Jun. 10, 2015, 11 Pgs.
In the Matter of Certain Network Devices, Related Software and Components Thereof (II), Investigation No. 337-TA-945 Before the U.S. International Trade Commission, Doc ID No. 558830—Transcript of Tutorial/Markman Hearing held Jun. 15, 2015, vol. 1, Jun. 16, 2015, 286 Pgs.
In the Matter of Certain Network Devices, Related Software and Components Thereof (II), Investigation No. 337-TA-945 Before the U.S. International Trade Commission, Doc ID No. 558900—Transcript of Tutorial/Markman Hearing held Jun. 15, 2015, vol. 2, Jun. 16, 2015, 263 Pgs.
In the Matter of Certain Network Devices, Related Software and Components Thereof (II), Investigation No. 337-TA-945 Before the U.S. International Trade Commission, Doc ID No. 559070—Complainant's Unopposed Motion to Partially Terminate the Investigation as to Certain Asserted Claims, Jun. 18, 2015, 5 Pgs.

(56) References Cited

OTHER PUBLICATIONS

In the Matter of Certain Network Devices, Related Software and Components Thereof (II), Investigation No. 337-TA-945 Before the U.S. International Trade Commission, Doc ID No. 559402—Respondent Arista Networks, Inc's Bullet-Point Summary of its Claims Construction Arguments, Jun. 23, 2015, 24 Pgs.
In the Matter of Certain Network Devices, Related Software and Components Thereof (II), Investigation No. 337-TA-945 Before the U.S. International Trade Commission, Doc ID No. 559404—Complainant Cisco Systems, Inc.'s Bullet-Point Summary of Claim Construction Positions, May 23, 2015, 33 Pgs.
In the Matter of Certain Network Devices, Related Software and Components Thereof (II), Investigation No. 337-TA-945 Before the U.S. International Trade Commission, Doc ID No. 559405—the Commission Investigative Staff's Bullet-Point Summary of its Claim Construction Arguments, Jun. 23, 2015, 20 Pgs.
In the Matter of Certain Network Devices, Related Software and Components Thereof (II), Investigation No. 337-TA-945 Before the U.S. International Trade Commission, Doc ID No. 560171—Initial Determination Granting Motion for Partial Termination on the Basis of Withdrawal of Certain Patent Claims, Jul. 7, 2015, 3 Pgs.
In the Matter of Certain Network Devices, Related Software and Components Thereof (II), Investigation No. 337-TA-945 Before the U.S. International Trade Commission, Doc ID No. 561985—Notice of Commission Decision Not to Review an Initial Determination Granting a Motion for Partial Termination of Certain Asserted Patent Claims, Jul. 29, 2015, 3 Pgs.
In the Matter of Certain Network Devices, Related Software and Components Thereof (II), Investigation No. 337-TA-945 Before the U.S. International Trade Commission, Doc ID No. 562843—Third Joint Report Regarding Streamlining the Issues to Be Decided in the Investigation and Second Supplemental Joint Claim Construction Chart, Aug. 11, 2015, 50 Pgs.
In the Matter of Certain Network Devices, Related Software and Components Thereof (II), Investigation No. 337-TA-945 Before the U.S. International Trade Commission, Doc ID No. 563069—Order No. 28 Amending Certain Ground Rules, Aug. 13, 2015, 4 Pgs.
In the Matter of Certain Network Devices, Related Software and Components Thereof (II), Investigation No. 337-TA-945 Before the U.S. International Trade Commission, Doc ID No. 564303—Fourth Joint Report Regarding Streamlining the Issues to be Decided in the Investigation, Aug. 27, 2015, 4 Pgs.
In the Matter of Certain Network Devices, Related Software and Components Thereof (II), Investigation No. 337-TA-945 Before the U.S. International Trade Commission, Doc ID No. 565593—Fifth Joint Report Regarding Streamlining the Issues to be Decided in the Investigation and Third Supplemental Joint Claim Construction Chart, Sep. 16, 2015, 48 Pgs.
In the Matter of Certain Network Devices, Related Software and Components Thereof (II), Investigation No. 337-TA-945 Before the U.S. International Trade Commission, Doc ID No. 565720—Order No. 32 Regarding Claim Construction, Sep. 18, 2015, 2 Pgs.
In the Matter of Certain Network Devices, Related Software and Components Thereof (II), Investigation No. 337-TA-945 Before the U.S. International Trade Commission, Doc ID No. 565820—Joint Motion to Amend the Procedural Schedule and Ground Rules Regarding Demonstrative Exhibits Associated with Live Witness Testimony, Exhibit Objections and Exhibit Lists, Sep. 21, 2015, 8 Pgs.
In the Matter of Certain Network Devices, Related Software and Components Thereof (II), Investigation No. 337-TA-945 Before the U.S. International Trade Commission, Doc ID No. 566702—Respondent Arista Network Inc.'s Motion for Leave to File a Reply in Support of its Motion to Amend the Ground Rules Regarding Page Limits on Pre-Hearing Briefs, Oct. 6, 2015, 7 Pgs.
In the Matter of Certain Network Devices, Related Software and Components Thereof (I), Investigation No. 337-TA-944 Before the U.S. International Trade Commission, Doc ID No. 548825—Letter dated Jan. 6, 2015 regarding Institution of Investigations, 6 Pgs.

In re Patent of Bechtolsheim & Cheriton, U.S. Pat. No. 7,023,853, Petition for Inter Partes Review of U.S. Pat. No. 7,023,853 Pursuant to 35 U.S.C. §§ 311-319, 37 C.F.R. § 42, 27 pgs.
In re Patent of Bechtolsheim & Cheriton, U.S. Pat. No. 7,023,853, *Declaration of Professor Jonathan Chao*, Exhibit ARISTA-1002 in IPR of U.S. Pat. No. 7,023,853, 40 pgs.
GIGAswitch/FDDI System Manager's Guide, Apr. 1995, Exhibit ARISTA-1005 in IPR of U.S. Pat. No. 7,023,853, 114 pgs.
Jon P. Wade et al., *A Ternary Content Addressable Search Engine* (IEEE Journal of Solid-State Circuits, vol. 24, No. 4, Aug. 1989), Exhibit ARISTA-1010 in IPR of U.S. Pat. No. 7,023,853, 11 pgs.
Lawrence Chisvin et al., *Content-Addressable and Associative Memory: Alternatives to the Ubiquitous RAM* (IEEE 1989), Exhibit ARISTA-1011 in IPR of U.S. Pat. No. 7,023,853, 14 pgs.
Bill Cheswick, *The Design of a Secure Internet Gateway* (Proceedings of the USENIX Summer '90 Conference, Jun. 1990), Exhibit ARISTA-1012 in IPR of U.S. Pat. No. 7,023,853, 6 pgs.
D. Brent Chapman, *Network (In)Security Through IP Packet Filtering* (Proceedings of the Third USENIX UNIX Security Symposium Sep. 1992), Exhibit ARISTA-1013 in IPR of U.S. Pat. No. 7,023,853, 14 pgs.
Anthony J. McAuley et al., *Fast Routing Table Lookup Using CAMs* (IEEE 1993), Exhibit ARISTA-1016 in IPR of U.S. Pat. No. 7,023,853, 10 pgs.
*Policy-Based Routing*, White Paper (Cisco Systems, Inc., 1996), Exhibit ARISTA-1017 in IPR of U.S. Pat. No. 7,023,853, 7 pgs.
Excerpts from *Gateway System Manual* (Cisco Systems, Inc., 1988) Exhibit ARISTA-1018 in IPR of U.S. Pat. No. 7,023,853, 20 pgs.
In re Patent of Bechtolsheim & Cheriton, U.S. Pat. No. 7,023,853, Petition for Inter Partes Review of U.S. Pat. No. 7,023,853 Pursuant to 35 U.S.C. §§ 311-319, 37 C.F.R. § 42, 24 pgs.
In re Patent of Bechtolsheim & Cheriton, U.S. Pat. No. 7,023,853, Declaration of Professor Jonathan Chao, Exhibit ARISTA-1002 in IPR of U.S. Pat. No. 7,023,853, 37 pgs.
Tong-Bi Pei et al., *VLSI Implementation of Routing Tables: Tries and CAMs* (IEEE 1991), Exhibit ARISTA-1008 in IPR of U.S. Pat. No. 7,023,853, 10 pgs.
J. Oldfield et al., *The Application of VLSI Content-Addressable Memories to the Acceleration of Logic Programming Systems* (IEEE 1987), Exhibit ARISTA-1009 in IPR of U.S. Pat. No. 7,023,853, 4 pgs.
Excerpts from Radia Pearlman, *Interconnections: Bridges and Routers* (1992), Exhibit ARISTA-1019 in IPR of U.S. Pat. No. 7,023,853, 26 pgs.
In re Patent of Bechtolsheim & Cheriton, U.S. Pat. No. 6,377,577, Petition for Inter Partes Review of U.S. Pat. No. 6,377,577 Pursuant to 35 U.S.C. §§ 311-319, 37 C.F.R. § 42, 59 pgs.
In re Patent of Bechtolsheim & Cheriton, U.S. Pat. No. 6,377,577, Declaration of Professor Jonathan Chao, Exhibit ARISTA-1002 in IPR of U.S. Pat. No. 6,377,577, 75 pgs.
In re Patent of Bechtolsheim & Cheriton, U.S. Pat. No. 6,377,577, Petition for Inter Partes Review of U.S. Pat. No. 6,377,577 Pursuant to 35 U.S.C. §§ 311-319, 37 C.F.R. § 42, 65 pgs.
In re Patent of Bechtolsheim & Cheriton, U.S. Pat. No. 6,377,577, *Declaration of Professor Jonathan Chao*, Exhibit ARISTA-1002 in IPR of U.S. Pat. No. 6,377,577, 84 pgs.
ATM User-Network Interface Specification, Version 3.0 (1993), Exhibit ARISTA-1021 in IPR of U.S. Pat. No. 6,377,577, 416 pgs.
Final Written Decision, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 26 pgs.
Decision, Denying Institution of Inter Partes Review Before the Patent Trial and Appeal Board, Case No. IPR2016-00301, *Arista Networks, Inc.* v. *Cisco Systems, Inc.* regarding U.S. Pat. No. 6,377,577, 9 pgs.
Decision, Instituting Inter Partes Review and Granting Motion for Change of Filing Date, Before the Patent Trial and Appeal Board, Case No. IPR2016-00303, *Arista Networks, Inc.* v. *Cisco Systems, Inc.* regarding U.S. Pat. No. 6,377,577, 23 pgs.
Decision, Instituting Inter Partes Review and Granting Motion for Change of Filing Date, Before the Patent Trial and Appeal Board,

(56) References Cited

OTHER PUBLICATIONS

Case No. IPR2016-00306, *Arista Networks, Inc.* v. *Cisco Systems, Inc.* regarding U.S. Pat. No. 7,023,853, 22 pgs.
Decision, Denying Institution of Inter Partes Review, Before the Patent Trial and Appeal Board, Case No. IPR2016-00304, *Arista Networks, Inc.* v. *Cisco Systems, Inc.* regarding U.S. Pat. No. 7,023,853, 8 pgs.
Decision, Denying Institution of Inter Partes Review, Before the Patent Trial and Appeal Board, Case No. IPR2016-00018, *Arista Networks, Inc* . v. *Cisco Systems, Inc.* regarding U.S. Pat. No. 8,051,211, 14 pgs.
Final Written Decision, Institution of Inter Partes Review Before the Patent Trial and Appeal Board, Case No. IPR2015-00978, *Arista Networks, Inc.* v. *Cisco Systems, Inc.* regarding U.S. Pat. No. 7,340,597, 27 pgs.
Notice of Filing Date Accorded to Petition and Time for Filing Patent Owner Preliminary Response, Before the Patent Trial and Appeal Board, Case No. IPR2016-00301, *Arista Networks, Inc.* v. *Cisco Systems, Inc.* regarding U.S. Pat. No. 6,377,577, 3 pgs.
Notice of Filing Date Accorded to Petition and Time for Filing Patent Owner Preliminary Response, Before the Patent Trial and Appeal Board, Case No. IPR2016-00303, *Arista Networks, Inc.* v. *Cisco Systems, Inc.* regarding U.S. Pat. No. 6,377,577, 3 pgs.
Notice of Filing Date Accorded to Petition and Time for Filing Patent Owner Preliminary Response, Before the Patent Trial and Appeal Board, Case No. IPR2016-00304, *Arista Networks, Inc.* v. *Cisco Systems, Inc.* regarding U.S. Pat. No. 7,023,853, 3 pgs.
Notice of Filing Date Accorded to Petition and Time for Filing Patent Owner Preliminary Response, Before the Patent Trial and Appeal Board, Case No. IPR2016-00306, *Arista Networks, Inc.* v. *Cisco Systems, Inc.* regarding U.S. Pat. No. 7,023,853, 3 pgs.
In the Matter of Certain Network Devices, Related Software and Components Thereof (II), Investigation No. 337-TA-945 Before the U.S. International Trade Commission, Doc ID 567942, Initial Determination, 4 Pgs.
In the Matter of Certain Network Devices, Related Software and Components Thereof (II), Investigation No. 337-TA-945 Before the U.S. International Trade Commission, Doc ID 568075, Corrected Initial Determination, 4 Pgs.
In the Matter of Certain Network Devices, Related Software and Components Thereof (II), Investigation No. 337-TA-945 Before the U.S. International Trade Commission, Doc ID 568606, Joint Report, 5 Pgs.
In the Matter of Certain Network Devices, Related Software and Components Thereof (II), Investigation No. 337-TA-945 Before the U.S. International Trade Commission, Doc ID 568642, Tutorial, 110 Pgs.
In the Matter of Certain Network Devices, Related Software and Components Thereof (II), Investigation No. 337-TA-945 Before the U.S. International Trade Commission, Doc ID 568651, Initial Determination, 54 Pgs.
In the Matter of Certain Network Devices, Related Software and Components Thereof (II), Investigation No. 337-TA-945 Before the U.S. International Trade Commission, Doc ID 568727, Open Sessions, 181 Pgs.
In the Matter of Certain Network Devices, Related Software and Components Thereof (II), Investigation No. 337-TA-945 Before the U.S. International Trade Commission, Doc ID 568728, 2nd Corrected, 4 Pgs.
In the Matter of Certain Network Devices, Related Software and Components Thereof (II), Investigation No. 337-TA-945 Before the U.S. International Trade Commission, Doc ID 568754, Joint Report, 18 Pgs.
In the Matter of Certain Network Devices, Related Software and Components Thereof (II), Investigation No. 337-TA-945 Before the U.S. International Trade Commission, Doc ID 568864, Open Sessions, 51 Pgs.
In the Matter of Certain Network Devices, Related Software and Components Thereof (II), Investigation No. 337-TA-945 Before the U.S. International Trade Commission, Doc ID 568949, Open Sessions, 62 Pgs.
In the Matter of Certain Network Devices, Related Software and Components Thereof (II), Investigation No. 337-TA-945 Before the U.S. International Trade Commission, Doc ID 569332, Order No. 40, 4 Pgs.
In the Matter of Certain Network Devices, Related Software and Components Thereof (II), Investigation No. 337-TA-945 Before the U.S. International Trade Commission, Doc ID 569333, Order No. 41, 5 Pgs.
In the Matter of Certain Network Devices, Related Software and Components Thereof (II), Investigation No. 337-TA-945 Before the U.S. International Trade Commission, Doc ID 569334, Order No. 49, 2 Pgs.
In the Matter of Certain Network Devices, Related Software and Components Thereof (II), Investigation No. 337-TA-945 Before the U.S. International Trade Commission, Doc ID 569330, Order No. 39, 5 Pgs.
In the Matter of Certain Network Devices, Related Software and Components Thereof (II), Investigation No. 337-TA-945 Before the U.S. International Trade Commission, Doc ID 569361, Notice, 3 Pgs.
In the Matter of Certain Network Devices, Related Software and Components Thereof (II), Investigation No. 337-TA-945 Before the U.S. International Trade Commission, Doc ID 569446, Open Sessions, 69 Pgs.
In the Matter of Certain Network Devices, Related Software and Components Thereof (II), Investigation No. 337-TA-945 Before the U.S. International Trade Commission, Doc ID 569418, Open Sessions, 50 Pgs.
In the Matter of Certain Network Devices, Related Software and Components Thereof (II), Investigation No. 337-TA-945 Before the U.S. International Trade Commission, Doc ID 569421, Open Sessions, 66 Pgs.
In the Matter of *Cisco Systems, Inc.* v. *Arista Networks, Inc.*, Case No. 3:14-cv-5343 Before the U.S. District Court in the Northern District of California, "*Demand for Jury Trial*," 22 Pgs.
In the Matter of *Cisco Systems, Inc.* v. *Arista Networks, Inc.*, Case No. 3:14-cv-5343 Before the U.S. District Court in the Northern District of California, "*Exhibit 1*," 2 Pgs.
Federal Register, vol. 81, No. 248, Dec. 27, 2016, Doc ID—599782, 2 Pgs.
In the Matter of Certain Network Devices, Related Software and Components Thereof (II), Investigation No. 337-TA-945 Before the U.S. International Trade Commission, Doc ID—600453—Petition, 28 Pgs.
Letter dated Jan. 9, 2017 from D. Sean Trainor to The Honorable Lisa R. Barton transmitting Petition, Doc ID—600464, 99 Pgs.
In the Matter of Certain Network Devices, Related Software and Components Thereof (II), Investigation No. 337-TA-945 Before the U.S. International Trade Commission, Doc ID—600477—Respondent's Petition, 204 Pgs.
In the Matter of Certain Network Devices, Related Software and Components Thereof (II), Investigation No. 337-TA-945 Before the U.S. International Trade Commission, Doc ID—600478—Respondent's Executive Summary, 12 Pgs.
In the Matter of Certain Network Devices, Related Software and Components Thereof (II), Investigation No. 337-TA-945 Before the U.S. International Trade Commission, Doc ID-600435—Initial Determination on Violation . . . , 335 Pgs.
In the Matter of Certain Network Devices, Related Software and Components Thereof (II), Investigation No. 337-TA-945 Before the U.S. International Trade Commission, Doc ID—601469—Respondent Arista Networks Inc.'s Response to Complainant's and the Staff's Petitions for Review, 67 Pgs.
In the Matter of Certain Network Devices, Related Software and Components Thereof (II), Investigation No. 337-TA-945 Before the U.S. International Trade Commission, Doc ID—601471—Respondent's Executive Summary, 28 Pgs.
In the Matter of Certain Network Devices, Related Software and Components Thereof (II), Investigation No. 337-TA-945 Before the

(56) References Cited

OTHER PUBLICATIONS

U.S. International Trade Commission, Doc ID—601474—Respondent's Public Interest Submission, 8 Pgs.
In the Matter of Certain Network Devices, Related Software and Components Thereof (II), Investigation No. 337-TA-945 Before the U.S. International Trade Commission, Doc ID—601476—Respondent's Public Interest Submission, 8 Pgs.
In the Matter of Certain Network Devices, Related Software and Components Thereof (II), Investigation No. 337-TA-945 Before the U.S. International Trade Commission, Doc ID—601493—Combined Response, 56 Pgs.
In the Matter of Certain Network Devices, Related Software and Components Thereof (II), Investigation No. 337-TA-945 Before the U.S. International Trade Commission, Doc ID—601515—Respondent's Notice, 41 Pgs.
Letter dated Jan. 23, 2017, from Adam R. Alper to The Honorable Lisa R. Barton transmitting Response to Petitions, Doc ID—601531, 108 Pgs.
Letter dated Jan. 23, 2017, from Adam R. Alper to The Honorable Lisa R. Barton transmitting Summary of Response to Petitions, Doc ID—601534, 14 Pgs.
Letter dated Jan. 23, 2017, from Adam R. Alper to The Honorable Lisa R. Barton transmitting Statement on the Public Interest, Doc ID—601538, 9 Pgs.
In the Matter of Certain Network Devices, Related Software and Components Thereof (II), Investigation No. 337-TA-945 Before the U.S. International Trade Commission, Doc ID—604298—Complainant's Response, 5 Pgs.
In the Matter of Certain Network Devices, Related Software and Components Thereof (II), Investigation No. 337-TA-945 Before the U.S. International Trade Commission, Doc ID—604626—Notice of Commission Decision, 8 Pgs.
Federal Register, vol. 82, No. 43, Mar. 7, 2017, Doc ID—604996, 4 Pgs.
In the Matter of Certain Network Devices, Related Software and Components Thereof (II), Investigation No. 337-TA-945 Before the U.S. International Trade Commission, Doc ID—606724—Respondent's Initial Written Submission, 127 Pgs.
Letter dated Mar. 27, 2017, from Adam R. Alper to The Honorable Lisa R. Barton transmitting Written Submission in Response to Commission's Determination, Doc ID—606725, 134 Pgs.
In the Matter of Certain Network Devices, Related Software and Components Thereof (II), Investigation No. 337-TA-945 Before the U.S. International Trade Commission, Doc ID—606730—The Office of Unfair Import Investigations' Response . . . , 53 Pgs.
Letter dated Apr. 5, 2017, from Adam R. Alper to The Honorable Lisa R. Barton transmitting Reply Brief, Doc ID—607537, 38 Pgs.
In the Matter of Certain Network Devices, Related Software and Components Thereof (II), Investigation No. 337-TA-945 Before the U.S. International Trade Commission, Doc ID—607570—Respondent's Response, 36 Pgs.
In the Matter of Certain Network Devices, Related Software and Components Thereof (II), Investigation No. 337-TA-945 Before the U.S. International Trade Commission, Doc ID—607626—"The Office of Unfair Import Investigations' Reply . . . ," 39 Pgs.
In the Matter of Certain Network Devices, Related Software and Components Thereof (II), Investigation No. 337-TA-945 Before the U.S. International Trade Commission, Doc ID—610667—"Notice of Commission Final Determination . . . ," 6 Pgs.
In the Matter of Certain Network Devices, Related Software and Components Thereof (II), Investigation No. 337-TA-945 Before the U.S. International Trade Commission, Doc ID—610672—"Limited Exclusion Order," 5 Pgs.
In the Matter of Certain Network Devices, Related Software and Components Thereof (II), Investigation No. 337-TA-945 Before the U.S. International Trade Commission, Doc ID—610673—"Cease and Desist Order," 8 Pgs.
Letter dated May 4, 2017, from The Honorable Lisa R. Barton to Charles Steuart, Chief, IPR & Restricted Merch. Branch, ITC, Doc ID—610671, 2 Pgs.
Letter dated May 4, 2017, from Rhonda K. Schmidtlein, Chairman to The Honorable Steven T. Mnuchin, Secretary of the Treasury, Doc ID—610836, 48 Pgs.
Letter dated May 8, 2017, from The Honorable Lisa R. Barton to Adam R. Alper, Esq., Doc ID—610920, 14 Pgs.
Federal Register, vol. 82, No. 89, May 10, 2017, Doc ID—611582, 3 Pgs.
In the Matter of Certain Network Devices, Related Software and Components Thereof (II), Investigation No. 337-TA-945 Before the U.S. International Trade Commission, Doc ID—612965—"Notice of Correction . . . ," 2 Pgs.
In the Matter of Certain Network Devices, Related Software and Components Thereof (II), Investigation No. 337-TA-945 Before the U.S. International Trade Commission, Doc ID—613184—"Commission Opinion," 138 Pgs.
In the Matter of Certain Network Devices, Related Software and Components Thereof (II), Investigation No. 337-TA-945 Before the U.S. International Trade Commission, Doc ID—613293—Complainant's Response, 10 Pgs.
Federal Register, vol. 82, No. 106, Jun. 5, 2017, Doc ID—613530, 1 Pg.
In the Matter of Certain Network Devices, Related Software and Components Thereof (II), Investigation No. 337-TA-945 Before the U.S. International Trade Commission, Doc ID—617701—Notice, 4 Pgs.
In the Matter of Certain Network Devices, Related Software and Components Thereof (II), Investigation No. 337-TA-945 Before the U.S. International Trade Commission, Doc ID—618942—Motion, 128 Pgs.
In the Matter of Certain Network Devices, Related Software and Components Thereof (II), Investigation No. 337-TA-945 Before the U.S. International Trade Commission, Doc ID—620120—"Commission Opinion," 21 Pgs.
In the Matter of Certain Network Devices, Related Software and Components Thereof (II), Investigation No. 337-TA-945 Before the U.S. International Trade Commission, Doc ID—620925—Motion, 23 Pgs.
Letter dated Sep. 5, 2017, from Adam R. Alper to The Honorable Lisa R. Barton., Doc ID—622157, 112 Pgs.
In the Matter of Certain Network Devices, Related Software and Components Thereof (II), Investigation No. 337-TA-945 Before the U.S. International Trade Commission, "Respondent Arista Networks Inc.'s Emergency Petition to Modify, Suspend, or Rescind Remedial Orders Pending Appeal of the Patent Trial and Appeal Board's Invalidation of Complainant Cisco Systems, Inc.'s U.S. Pat. No. 6,377,577 . . . ," 126 Pgs.
In the Matter of Certain Network Devices, Related Software and Components Thereof (II), Investigation No. 337-TA-945 Before the U.S. International Trade Commission, "Respondent Arista Networks Inc.'s Emergency Petition Suspend or Rescind Remedial Orders Pending Appeal of the Patent Trial and Appeal Board's Invalidation of Complainant Cisco Systems, Inc.'s U.S. Pat. No. 7,224,668 and U.S. Pat. No. 6,377,57 . . . ," 125 Pgs.
In the Matter of Certain Network Devices, Related Software and Components Thereof (II), Investigation No. 337-TA-945 Before the U.S. International Trade Commission, "Complainant Cisco Systems Inc.'s Opposition to Respondent Arista Networks Inc.'s Emergency Petition to Modify, Suspend, or Rescind Remedial Orders Pending Appeal of the Patent Trial and Appeal Board's Invalidation of Complainant Cisco Systems, Inc.'s U.S. Pat. No. 7,224,668 and U.S. Pat. No. 6,377,577 . . . ," 142 Pgs.
In the Matter of Certain Network Devices, Related Software and Components Thereof (II), Investigation No. 337-TA-945 Before the U.S. International Trade Commission, "The Office of Unfair Import Investigations' Response to Arista Networks Inc.'s Emergency Petitions to Suspend or Rescind Remedial Orders," 35 Pgs.
In the Matter of Certain Network Devices, Related Software and Components Thereof (II), Investigation No. 337-TA-945 Before the U.S. International Trade Commission, "Respondent Arista Networks Inc.'s Motion for Leave to File a Reply in Support of its Emergency Petition to Suspend or Rescind Remedial Orders Pending Appeal of the Patent Trial and Appeal Board's Invalidation of

(56) References Cited

OTHER PUBLICATIONS

Complainant Cisco Systems, Inc.'s U.S. Pat. No. 7,224,668 and U.S. Pat. No. 6,377,577 . . . ," 72 Pgs.
In the Matter of Certain Network Devices, Related Software and Components Thereof (II), Investigation No. 337-TA-945 Before the U.S. International Trade Commission, "Complainant Cisco Systems, Inc.'s Opposition to Respondent Arista Networks Inc.'s Motion for Leave to File a Reply in Support of its Emergency Petition to Modify, Suspend or Rescind Remedial Orders Pending Appeal of the Patent Trial and Appeal Board's Invalidation of Complainant Cisco Systems, Inc.'s U.S. Pat. No. 7,224,668 and U.S. Pat. No. 6,377,577 . . . ," 31 Pgs.
In the Matter of Certain Network Devices, Related Software and Components Thereof (II), Investigation No. 337-TA-945 Before the U.S. International Trade Commission, "Respondent Arista Networks Inc.'s Supplemental Brief Regarding Jun. 2, 2017 Emergency Petition to Suspend or Rescind Remedial Orders Pending Appeal of the Patent Trial and Appeal Board's Invalidation of Complainant Cisco Systems, Inc.'s U.S. Pat. No. 7,224,668 and U.S. Pat. No. 6,377,577," 13 Pgs.
Petitioner Demonstratives, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 90 pgs.
Petitioner Updated Exhibit List, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 4 pgs.
Patent Owner's Updated Exhibit List, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 4 pgs.
Patent Owner's Demonstratives, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 63 pgs.
Petitioner's Notice of Appeal to the U.S. Court of Appeals for the Federal Circuit, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 63 pgs.
Patent Owner Cisco Systems Inc.'s Notice of Cross Appeal, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 63 pgs.
Decision, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 14 pgs.
Exhibit Arista—1010, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 24 pgs.
Exhibit Arista—1012, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 161 pgs.
Patent Owner's Objections to Petitioner's Evidence Pursuant to 37 CFR 42.64(b)(1), Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 7 pgs.
Petitioner's Notice of Objections to Evidence, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 5 pgs.
Patent Owner Response, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 65 pgs.
Patent Owner Preliminary Response, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 49 pgs.
Petition for Inter Partes Review of U.S. Pat. No. 8,051,211, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 66 pgs.
Declaration of Dr. Kevin Jeffay in Support of Patent Owner Response, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 68 pgs.
Deposition of Expert Bill Lin, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 93 pgs.
Exhibit 2006, "Part 3: Carrier sense multiple access with collision detection (CSMA/CD) access method and physical layer specifications," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 1554 pgs.
Exhibit 2007, ITC Inv. No. 337-TA-945, "Order No. 45: Construing Certain Terms of the Asserted Claims of the Patents at Issue" Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 81 pgs.
Exhibit 2008 (Part 1 of 2), Tanenbaum, "Computer Networks," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 417 pgs.
Exhibit 2008 (Part 2 of 2), Tanenbaum, Ch. 5 "The Network Layer," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 416 pgs.
Exhibit 2009 (Part 1 of 2), Shinder, "Computer Networking Essentials," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 381 pgs.
Exhibit 2009 (Part 2 of 2), Shinder, Ch. 12 "Desktop Operating Systems," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 381 pgs.
Exhibit 2010 (Part 1of 2), Gallo, "Networking Explained," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 341 pgs.
Exhibit 2010 (Part 2 of 2), Gallo, "Networking Explained," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 340 pgs.
Exhibit 2011 (Part 1 of 4), Kurose, "Computer Networking—A Top-Down Approach Featuring the Internet," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 150 pgs.
Exhibit 2011 (Part 2 of 4), Kurose, "Computer Networking—A Top-Down Approach Featuring the Internet," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 150 pgs.
Exhibit 2011 (Part 3 of 4), Kurose, "Computer Networking—A Top-Down Approach Featuring the Internet," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 150 pgs.
Exhibit 2011 (Part 4 of 4), Kurose, "Computer Networking—A Top-Down Approach Featuring the Internet," Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 162 pgs.
Exhibit 2012, Jeffay, "COMP 249 Advanced Distributed Systems," Institution of Inter Partes Review Before the Patent Trial and Appeal

(56) References Cited

OTHER PUBLICATIONS

Board, Case No. IPR2015-00975, *Arista Networks, Inc.* v. *Cisco Systems, Inc.* regarding U.S. Pat. No. 8,051,211, 19 pgs.
Exhibit 2013, ITC Transcript of Open Sessions, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 50 pgs.
Petitioner's Notice of Objections to Evidence, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 13 pgs.
Petitioner's Notice of Deposition of Dr. Kevin Jeffay, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 3 pgs.
Petitioner Reply Pursuant to Paper 28, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 5 pgs.
Exhibit 1023, Merriam-Webster's Collegiate Dictionary, Tenth Edition (excerpt), Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 6 pgs.
Exhibit 1024, American Heritage College Dictionary, Third Edition (excerpt), Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 3 pgs.
Exhibit 1025, Declaration of Dr. Bill Lin I Support of Petitioner Reply, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 19 pgs.
Patent Owner's Objections to Petitioner's Evidence Pursuant to 37 CFR 42.64(b)(1), Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 14 pgs.
Petitioner Reply to Patent Owner Response, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 31 pgs.
Exhibit 1014, Declaration of Dr. Kevin Jeffay in Support of Complainant, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 91 pgs.
Exhibit 1015, Peterson, Computer Network A Systems Approach, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 11 pgs.
Exhibit 1020, Cisco Demonstrative Exhibit, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 1 pgs.
Exhibit 1022, Deposition of Dr. Kevin Jeffay, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 150 pgs.
Petitioner's Conditional Motion to Exclude Evidence, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 7 pgs.
Patent Owner's Response Pursuant to Board's Order, Institution of Inter Partes Review Before the Patent Trial and Appeal Board, Case No. IPR2015-00975, *Arista Networks, Inc.* v. *Cisco Systems, Inc.* regarding U.S. Pat. No. 8,051,211, 5 pgs.
Petition for Inter Partes Review of U.S. Pat. No. 8.051,211 Pursuant to 35 USC 311-319, 37 CFR 42, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 49 pgs.

Cisco Systems, Inc.'s Mandatory Notices Pursuant to 37 CFR 42.8(a)(2), Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 5 pgs.
Patent Owner Preliminary Response, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 54 pgs.
Decision Denying Institution of Inter Partes Review, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 14 pgs.
Exhibit Arista—1014—Declaration of Dr. Bill Lin, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 42 pgs.
Exhibit 200—Arista White Paper, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 10 pgs.
Exhibit 2002—Microsoft Computer Dictionary, Fifth Edition, Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 3 pgs.
Exhibit 2003—Tanenbaum, "Computer Networks, Third Edition," Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 7 pgs.
Exhibit 2004—Bird, "Network+–Training Guide," Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 27 pgs.
Exhibit 2005, ITC Inv. No. 337-TA-945, "Order No. 45: Construing Certain Terms of the Asserted Claims of the Patents at Issue" Institution of Inter Partes Review Before the Patent Trial and Appeal Board, Case No. IPR2016-00018, *Arista Networks, Inc.* v. *Cisco Systems, Inc.* regarding U.S. Pat. No. 8,051,211, 81 pgs.
In the Matter of Certain Network Devices, Related Software and Components Thereof (II), Investigation No. 337-TA-945 Before the U.S. International Trade Commission, Doc ID 569423 "Open Sessions," 153 Pgs.
In the Matter of Certain Network Devices, Related Software and Components Thereof (II), Investigation No. 337-TA-945 Before the U.S. International Trade Commission, Doc ID 569594, Order No. 43, 17 Pgs.
In the Matter of Certain Network Devices, Related Software and Components Thereof (II), Investigation No. 337-TA-945 Before the U.S. International Trade Commission, Doc ID 569701, Open Sessions, 145 Pgs.
In the Matter of Certain Network Devices, Related Software and Components Thereof (II), Investigation No. 337-TA-945 Before the U.S. International Trade Commission, Doc ID 569788, Order No. 50, 2 Pgs.
In the Matter of Certain Network Devices, Related Software and Components Thereof (II), Investigation No. 337-TA-945 Before the U.S. International Trade Commission, Doc ID 569786, Order No. 44, 9 Pgs.
In the Matter of Certain Network Devices, Related Software and Components Thereof (II), Investigation No. 337-TA-945 Before the U.S. International Trade Commission, Doc ID 570018, Notice, 3 Pgs.
In the Matter of Certain Network Devices, Related Software and Components Thereof (II), Investigation No. 337-TA-945 Before the U.S. International Trade Commission, Doc ID 570257, Order No. 45, 81 Pgs.
In the Matter of Certain Network Devices, Related Software and Components Thereof (II), Investigation No. 337-TA-945 Before the U.S. International Trade Commission, Doc ID 570502, Open Sessions, 109 Pgs.
In the Matter of Certain Network Devices, Related Software and Components Thereof (II), Investigation No. 337-TA-945 Before the U.S. International Trade Commission, Doc ID 570750, Unopposed Motion, 8 Pgs.

(56) References Cited

OTHER PUBLICATIONS

In the Matter of Certain Network Devices, Related Software and Components Thereof (II), Investigation No. 337-TA-945 Before the U.S. International Trade Commission, Doc ID 570844, Open Sessions, 159 Pgs.
In the Matter of Certain Network Devices, Related Software and Components Thereof (II), Investigation No. 337-TA-945 Before the U.S. International Trade Commission, Doc ID 571292, 4 Pgs.
In the Matter of Certain Network Devices, Related Software and Components Thereof (II), Investigation No. 337-TA-945 Before the U.S. International Trade Commission, Doc ID 574011, "Arista: 7010T . . . ", 7 Pgs.
In the Matter of Certain Network Devices, Related Software and Components Thereof (II), Investigation No. 337-TA-945 Before the U.S. International Trade Commission, Doc ID 574012, 1 Pg.
In the Matter of Certain Network Devices, Related Software and Components Thereof (II), Investigation No. 337-TA-945 Before the U.S. International Trade Commission, Doc ID 574013, 20 Pgs.
In the Matter of Certain Network Devices, Related Software and Components Thereof (II), Investigation No. 337-TA-945 Before the U.S. International Trade Commission, Doc ID 574014, Pictures, 5 Pgs.
In the Matter of Certain Network Devices, Related Software and Components Thereof (II), Investigation No. 337-TA-945 Before the U.S. International Trade Commission, Doc ID 574023, 1 Pg.
In the Matter of Certain Network Devices, Related Software and Components Thereof (II), Investigation No. 337-TA-945 Before the U.S. International Trade Commission, Doc ID 574022, 8 Pgs.
In the Matter of Certain Network Devices, Related Software and Components Thereof (II), Investigation No. 337-TA-945 Before the U.S. International Trade Commission, Doc ID 574021, 5 Pgs.
In the Matter of Certain Network Devices, Related Software and Components Thereof (II), Investigation No. 337-TA-945 Before the U.S. International Trade Commission, Doc ID 576904, 4 Pgs.
In the Matter of Certain Network Devices, Related Software and Components Thereof (II), Investigation No. 337-TA-945 Before the U.S. International Trade Commission, Doc ID 577057, 5 Pgs.
In the Matter of Certain Network Devices, Related Software and Components Thereof (II), Investigation No. 337-TA-945 Before the U.S. International Trade Commission, Doc ID 584774, 77 Pgs.
In the Matter of Certain Network Devices, Related Software and Components Thereof (II), Investigation No. 337-TA-945 Before the U.S. International Trade Commission, Doc ID 587235, 5 Pgs.
In the Matter of Certain Network Devices, Related Software and Components Thereof (II), Investigation No. 337-TA-945 Before the U.S. International Trade Commission, Doc ID 592433, 31 Pgs.
In the Matter of Certain Network Devices, Related Software and Components Thereof (II), Investigation No. 337-TA-945 Before the U.S. International Trade Commission, Doc ID 597386, 2 Pgs.
Report of Respondent Arista Networks, Inc. Pursuant to Section V of the Cease and Desist Order—1257952-635176 (1).
Report of Respondent Arista Networks, Inc. Pursuant to Section V of the Cease and Desist Order—1257952-635176.
Order Requiring Joint Status Report.
Order Requiring Joint Status Report (2).
Notice of Designation of Lead Counsel.
Joint Stipulation and [Proposed] Order to Extend Deadline to Submit Joint Status Report Pursuant to Dkt. No. 35.
Joint Status Report Pursuant to Dkt. No. 35.
Stipulated Dismissal With Prejudice Between Plaintiff Cisco Systems, Inc. And Defendant Arista Networks, Inc. Pursuant to Fed. R. Civ. P. 41(A) and Prop.
Stipulated Dismissal With Prejudice Between Plaintiff Cisco Systems, Inc. And Defendant Arista Networks, Inc. Pursuant to Fed. R. Civ. P. 41(A) and Order.
Order Granting Joint Motion for an Indicative Ruling to Vacate Judgment Pursuant to Fed. R. Civ. P 62.1.
Order Striking Administrative Motion for Leave to File Under Seal At Ecf 793.
Notice of Motion and Motion (7 pgs).
Exhibit A—43 pages.
(Proposed) Order Granting Joint Motion for Indicative Ruling to Vacate Judgment Pursuant to Fed. R. Civ. P 62.1.
Declaration of William P. Nelson in Support of Arista Networks Inc.'s Administrative Motion for Leave to File Under Seal (3 pgs.).
(Proposed) Order Granting Arista's Administrative Motion to File Under Seal (3 pgs).
Arista Networks, Inc.'s Opposition to Cisco Systems, Inc's Motion for Summary Judgement (33 pgs).
Arista Networks, Inc.'s Opposition to Cisco's Daubert Motion to Exclude, in Part, the Expert Opinion of Fiona Scott Morton, Ph.D. (13 pgs.).
Arista Networks, Inc.'s Response to Cisco Systems Inc.'s Daubert Motion to Exclude the Expert Opinion of John R. Black, Jr. (4 pgs.).
Plaintiff Arista Networks, Inc.'s Administrative Motion for Leave to File Under Seal . . . (7 pgs.).
Certain Network Devices, Related Software and Components Thereof (II) Notice of Commission Determination to Review and Clarify AN Initial Determination Granting Respondent's Unopposed Motion for Return of Its Bonds; US International Trade Commission Investigation No. 337-TA-945 (4 pgs.).
The United States Patent and Trademark Office, Before the Patent Trial and Appeal Board, in the Matter of *Arista Networks, Inc.* v. *Cisco Systems, Inc.*, IPR2015-00975, U.S. Pat. No. 8,051,211, "Decision on Remand" Decided Sep. 4, 2018. 19 Pgs.
Inter Partes Review Certificate, U.S. Pat. No. 8,051,211 K1, Issued May 31, 2019.
Before the United States Court of Appeals for the Federal Circuit, In the Matter of *Arista Networks, Inc.* v. *Cisco Systems, Inc.*, 2017-1313, 2017-1380, "Opinion/ Disposition—Appeals from the U.S. Patent and Trademark Office, Patent Trial and Appeal Board in No. IPR2015-00975" Decided Mar. 28, 2018. 8 Pgs.

* cited by examiner

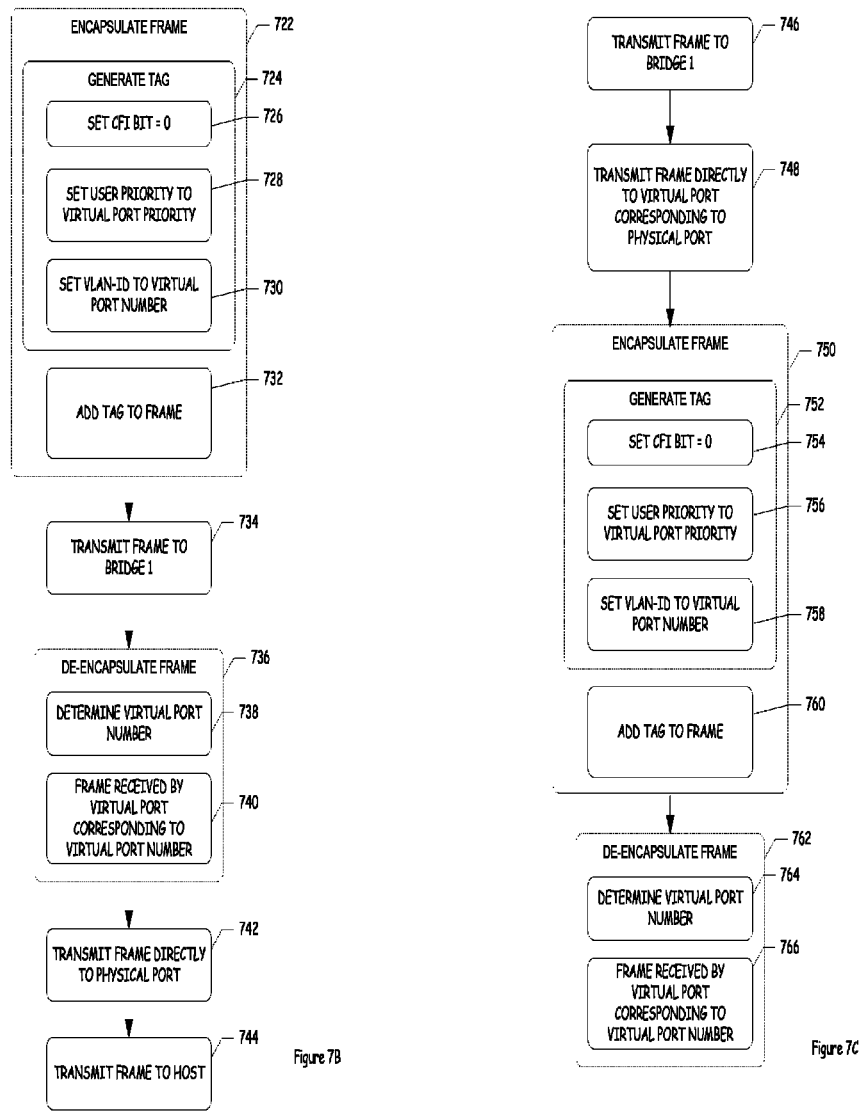

MULTI-BRIDGE LAN AGGREGATION

CROSS-REFERENCE TO RELATED APPLICATIONS

The present patent application is a continuation of U.S. patent application Ser. No. 13/285,985, filed on Oct. 31, 2011, entitled "Multi-Bridge LAN Aggregation," which is a continuation of U.S. patent application Ser. No. 10/282,438, filed on Oct. 29, 2002, now U.S. Pat. No. 8,051,211, entitled "Multi-Bridge LAN Aggregation," which are incorporated by reference in their entirety and for all purposes as if completely and fully set forth herein.

FIELD OF THE INVENTION

The present invention relates generally to computer networks and, more specifically, to a multi-bridge LAN aggregated method and system for use in a computer network.

DESCRIPTION OF THE RELATED ART

Computer Networks

Generally, a computer network is a group of computers (or hosts) coupled to each other in a way that allows information to be exchanged between the computers. A local area network is a common example of a computer network. As its name implies, a LAN is a computer network which is organized within a given geographic area or locale, such as a college campus, a site of a corporation, a single building, etc. Various types of LANs include Ethernet, FDDI, and Token Ring. The LAN type refers to the physical medium and connections over which traffic (i.e., data) is carried using hardware specific to the LAN type. Data on LANs are carried in frames. As used herein, a frame refers to information which is transferred between a host and a bridge and/or between multiple bridges. Each frame includes, at least, a destination link layer address, a source link layer address, a frame type indication, and data. Each frame transmitted to a given LAN can be observed and/or received by every other computer or intermediate network device attached to that LAN.

A number of individual LANs may be coupled together with bridges to create a Bridged LAN. Bridges are intermediate network devices which can be used to interconnect LANs at the link layer to enable computers on one LAN to communicate with the computers of another LAN. Bridges forward frames, as necessary, from one LAN to another, using the destination link layer address of the frames. Bridges learn which LAN Segments to forward the frames on based on the source link layer addresses of the frames. In general, a Bridged LAN can connect many more computers together, and cover a much wider geographical range, than a single LAN. The term "LAN Segment" is often used to refer to a non-bridged LAN (a LAN that includes no bridges). Although a LAN may refer to a computer network organized in a given locale, as used herein, the term "LAN" is used to refer to a physical connection between one or more hosts (e.g., a LAN Segment). Also, as used herein, the term "host" refers to an end-station which is the source of, or destination of, frames transmitted over a network.

A router is an intermediate network device which also interconnects a number of LANs and/or other types of transmission media. For example, a router may be used to connect one Ethernet LAN (or Bridged LAN) to another, or to connect a FDDI LAN to a digital satellite link. Routers generally forward packets, which are essentially data coupled with header information which describes properties of the packet such as a source network layer address, a destination network layer address, and a packet length. The router forwards packets from one LAN to another, adding or removing frame information such as link layer addresses, as needed. A router knows which LAN to send the packets on based on information within the packet itself and a configuration table accessible by the router which correlates address information to LAN information. The term "switch" is sometimes used for an intermediate network device that combines some or all of the functions of both a router and a bridge.

Often, it is desirable to have redundant physical connections to a computer network (e.g., redundant physical connections to multiple intermediate network devices) to improve availability. Unfortunately, some current methods of providing redundancy are inefficient, limited in use, and create undesirable consequences.

Link Aggregation

FIG. 1 illustrates a host 102 coupled to a LAN 104 via a bridge 106 and LANs 108 and 109. Host 102 includes network interfaces 110 (e.g., S0 and S1), both of the same medium (e.g., Ethernet). Bridge 106 includes ports 114 (e.g., ports A0-A2). As seen in FIG. 1, two LANs are provided from host 102 to bridge 106, LAN 108 from network interface S0 to port A0, and LAN 109 from network interface S1 to port A1. In configuring host 102 and bridge 106 in this manner, should one of the LANs 108-109 fail, another LAN is available to transport data.

Unfortunately, a consequence of utilizing multiple network interfaces 110 of host 102 to connect to LAN 104 is an increase in the number of IP addresses which host 102 is associated. This increase results from an internet protocol (IP) address being associated with each network interface of a host. Having multiple IP addresses associated with a single host is disadvantageous for a number of reasons. Initially, confusion results as to which IP addresses should be used to communicate with the host and management of the host is made more difficult. Further, use of multiple IP addresses for a host creates inefficiency due to the time it takes to determine the IP addresses associated with the host, and the space consumed in storing the multiple IP addresses.

Link aggregation (also known as trunking) alleviates some of the problems associated with multiple IP addresses by grouping LANs of the same medium type and speed together to form a link aggregation group, which is treated as a single link with the capacity of all the links combined. Commonly known protocols and software may be used to enable link aggregation on bridge 106 and host 102. For example, Link Aggregation Control Protocol (LACP) is a common link aggregation protocol defined in IEEE Std. 802.3-2000, clause 43. Similarly, Port Aggregation Protocol (PAgP) is a well known protocol developed by Cisco Systems, Inc. and useful for dynamically aggregating redundant links connecting two or more devices.

With bridge 106 and host 102 configured for link aggregation, the multiple links between them are seen as one link, and consequently host 102 may be seen from a network as having one IP address, even though multiple interfaces of host 102 may be connected to the network. Additionally, aggregating the multiple links through link aggregation has the advantage of increasing the bandwidth between host 102 and bridge 106 to twice that of what the bandwidth would be without link aggregation. Further if one of the links between host 102 and bridge 106 were to fail, communication would resume on the remaining links. Unfortunately, although link aggregation provides a redundant coupling to bridge 106, no redundancy is provided between LAN 104 and bridge 106. Thus, if bridge 106 were to fail, host 102 would lose communication with LAN 104.

Another method of providing redundant connections between a host and a LAN is to couple a host to multiple bridges with multiple wires. FIG. 2 includes a host 202 coupled to LAN 204 via bridges 206-208 and LANs 210-212. Host 202 includes network interfaces 214 (e.g., S0 and S1). Bridges 206 and 208 includes ports 218 (e.g., ports A0-A1 and B0-B1, respectively). As can be seen from FIG. 2, redundancy is provided from host 202 to LAN 204, accomplished in part by bridges 206 and 208.

The advantages provided by the configuration illustrated in FIG. 2 include the utilization of redundant bridges. If bridge 206 where to fail, host 202 would still be able to communicate with LAN 204, and vice versa if bridge 208 were to fail. However, two IP addresses are associated with host 202, one for each network interface S0 and S1, which introduces the aforementioned disadvantages associated with managing hosts with multiple IP addresses. Link aggregation is not available in such a scenario because link aggregation does not support multi-bridge configurations with a single host. Link aggregation is traditionally only available between two devices (e.g., one bridge and one host). In addition, although two LANs are shown coupled to host 202, the bandwidth of host 202 is not automatically doubled. The use of LANs 210-212 is determined by the host IP address chosen, and thus may be under the control of neither host 102 nor bridges 206-208.

Another traditional implementation of providing redundant physical connections to a network involves stacking multiple bridges together and configuring the multiple bridges to appear as one bridge. In order to accomplish this, however, the bridges must be configured to communicate with each other for sharing and learning network and frame information. Although this configuration may be a reasonable solution for providing redundancy if the bridges are in close proximity to each other (e.g., stacked on top of or next to each other) and the necessary cabling and configuration is provided, it has many pitfalls. If one of the bridges and or cables connecting the bridges were to fail, the network connection would be lost, since the bridges could no longer "learn" from each other (e.g., learning link layer addresses from each other). Additionally, such a configuration is not desirable if the bridges are to be at arms length from each other and independent of each other (i.e., not have to depend on other bridges for learning network and address information).

SUMMARY OF THE INVENTION

In one embodiment of the present invention, a method of multi-bridge LAN aggregation is disclosed. The method includes aggregating a plurality of LANs coupling a host to a first and a second intermediate network device.

In another embodiment of the present invention, a system is disclosed. The system includes an intermediate network device. The intermediate network device includes a multi-bridge engine. The multi-bridge engine includes a tunnel engine coupled to a bridge interconnect port and a first physical port.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

DETAILED DESCRIPTION OF THE INVENTION

Introduction

Figure 1:
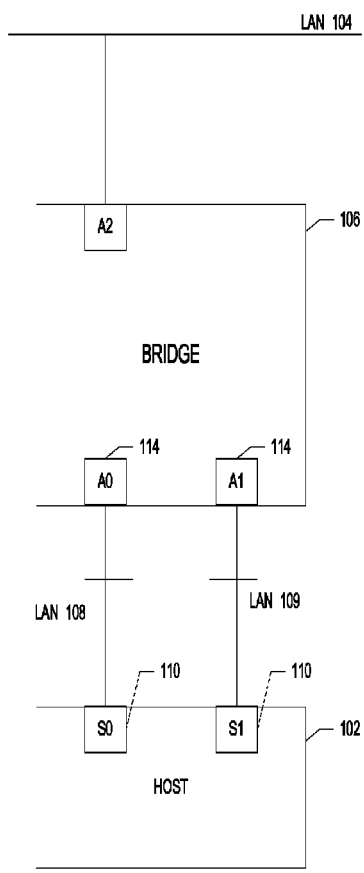
FIG. 1, labeled as prior art, is a block diagram of an implementation of link aggregation.
Figure 2:
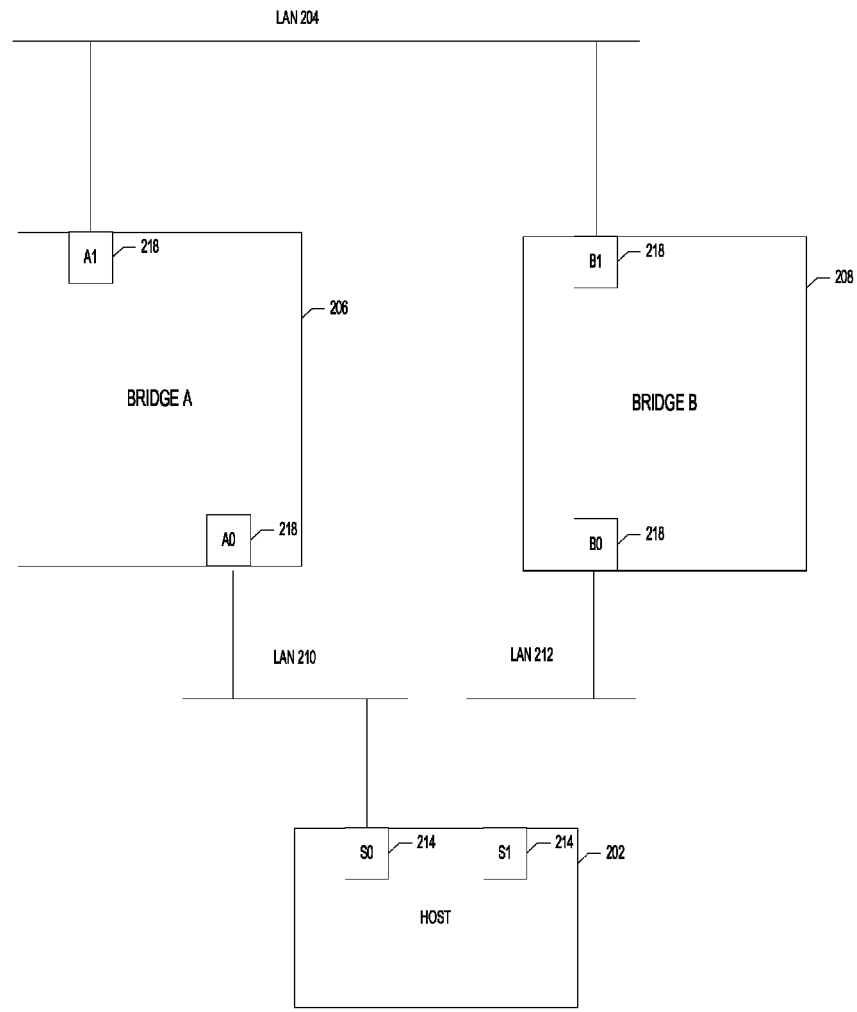
FIG. 2, labeled as prior art, is a block diagram of an exemplary network connection in the absence of link aggregation.

The present invention generally enables link aggregation to be utilized on redundant physical connections between a host and multiple network devices, thus improving reliability and availability of data transmitted to and from the host. As used herein, link aggregation is used to refer to implementations of link aggregation such as IEEE Standard 802.3-2000, clause 43 and Etherchannel. The following is intended to provide a detailed description of an example of the invention and should not be taken to be limiting of the invention itself. Rather, any number of variations may fall within the scope of the invention which is defined in the claims following the description.

Exemplary Network Architecture

FIG. 3 is a block diagram of a computer network 300 including an embodiment of multi-bridge LAN aggregation in accordance with the present invention. Network 300 includes LANs 302-338 interconnected by a number of intermediate network devices, such as bridges 340-344, and routers 346. The intermediate network devices include ports 352 which allow the intermediate network devices to physically connect to one another and to other network devices. As used herein, port refers to a point of attachment to a LAN through which an intermediate network device (e.g., a bridge) transmits and receives data (e.g., media access control frames). Network 300 also includes hosts 354-358 which, in the described embodiment of the present invention, are server computer systems configured to send and receive information on network 300.

It is desirable that a host, host 356 for example, be coupled to network 300 such that if one path connecting host 356 to network 300 were to fail, including the failure of an intermediate device (e.g., bridge 342), an alternate path would be available. Additionally, it is also desirable that such a configuration provide host 356 on network 300 with a single IP address, and also utilize any redundant links coupled to host 356 to increase the bandwidth of information sent to and from host 356. Accordingly, host 356 is coupled to network 300 in a multi-bridge LAN aggregation configuration in accordance with one embodiment of the present invention. Similarly, host 358 is also coupled to network 300 in a multi-bridge LAN aggregation configuration in accordance with one embodiment of the present invention.

Figure 3A:
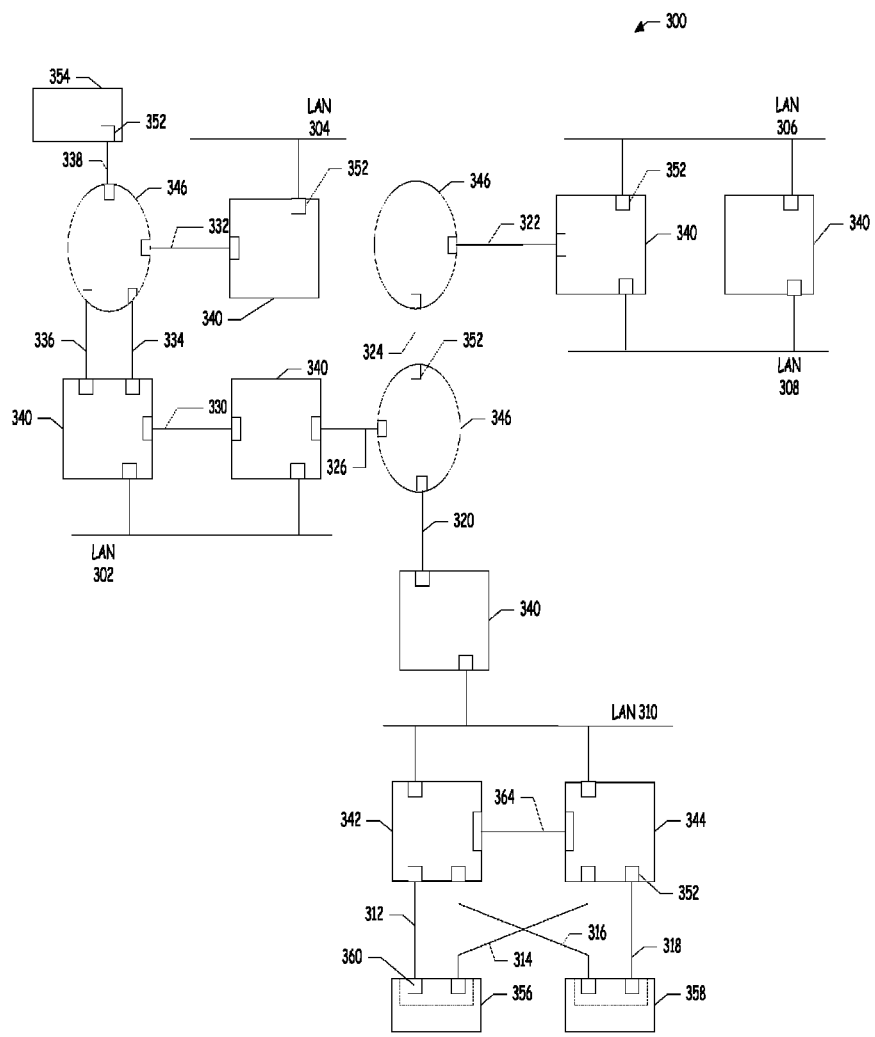
FIGS. 3(A-B) are block diagrams of a computer network including an embodiment of multi-bridge LAN aggregation in accordance with the present invention.

As seen from FIG. 3A, host 356 is coupled to LAN 310 via, at least, LANs 312-314 and bridges 342-344. If bridge 342 and/or LAN 312 were to fail, host 356 would be able to communicate with LAN 310 via LAN 314 and bridge 344. A similar situation would result if bridge 344 and/or LAN 314 were to fail. Additionally, bridge 344 and host 356 are configured for link aggregation, allowing both LAN 312-314 to be simultaneously utilized for transmitting information to and from host 356 and allowing host 356 to be seen from LAN 310 as having a single IP address.

In similar fashion, host 358 is coupled to LAN 310 via, at least, LANs 316-318 and bridges 342-344. If bridge 344 and/or LAN 318 were to fail, host 358 would still be able to communicate with LAN 310 via LAN 316 and bridge 342. A similar situation would result if bridge 342 and/or LAN 316 were to fail. Additionally, bridge 342 and host 358 are configured for link aggregation, allowing both LANs 316-318 to be simultaneously utilized for transmitting information to and from host 358 and allowing host 358 to be seen from LAN 310 as having a single IP address.

It should be understood that network 300 is provided as an exemplary network in which multi-bridge LAN aggregation in accordance with the present invention can be implemented. Other embodiments of the present invention may be implemented in networks other than network 300, and consequently the present invention should not be limited to network 300.

Exemplary Multi-Bridge LAN Aggregation Configuration

Figure 3B:
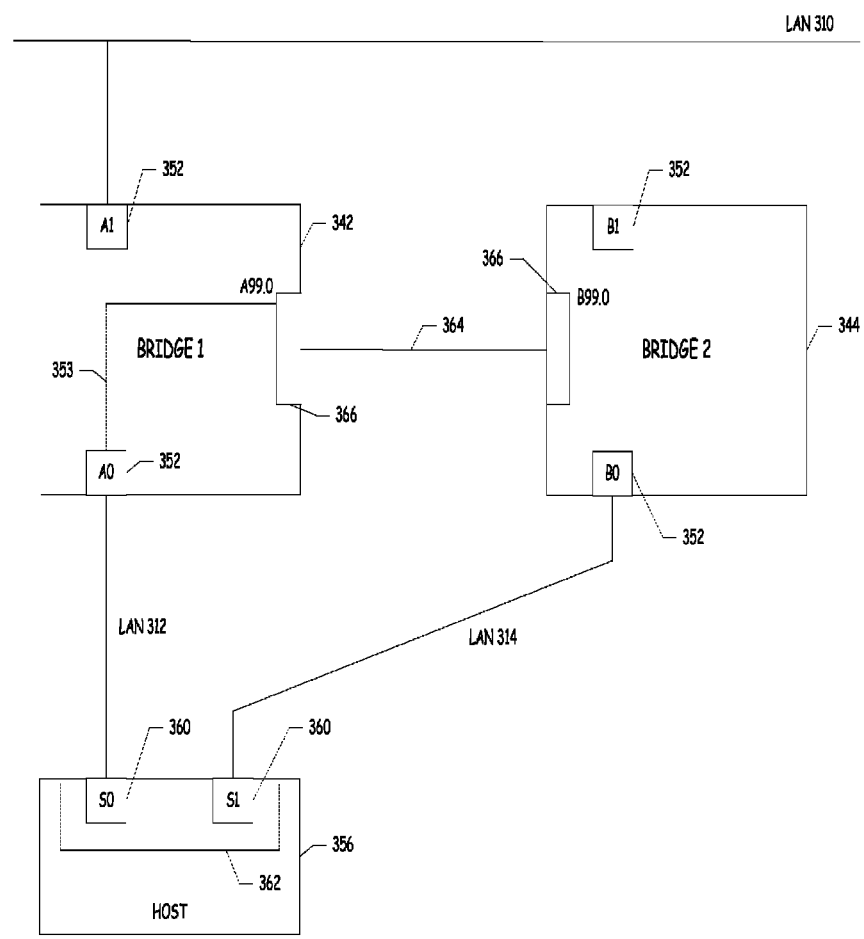

FIG. 3B illustrates a portion of network 300 in closer detail. The portion illustrated is provided only for aiding in the description of the present invention. As illustrated in FIG. 3B, LAN 310 is coupled to intermediate network devices 342 and 344. In one embodiment of the present invention, intermediate network devices 342 and 344 are Layer 2 (or "L2") Ethernet switches. A L2 switch, as is commonly known, is a switch which operates on the data-link layer of the OSI reference model. In the described embodiment, intermediate network devices 342 and 344 are bridges. Bridges 342 and 344 include ports 352 (e.g., ports A0-A1 and ports B0-B1, respectively) and bridge-interconnect ports 366. In the described embodiment, bridge-interconnect port 366 represents a logical port. Many logical ports may be multiplexed over a single physical port (or multiple physical ports, if Link Aggregation is employed). Included in bridge-interconnect ports 366 is sub-port A99.0 which is logically coupled to port A0. Ports 352 allow bridges 342 and 344 to be physically coupled to LANs 310-314. Bridge 342 and 344 are coupled to each other via inter-bridge link 364. In one embodiment of the present invention, inter-bridge link 364 represents one LAN or many LANs Link Aggregated together.

Host 356 is connected to both bridges 342 and 344 through network interfaces 360 (e.g., S0 and S1). Together, network interfaces 360 are configured as one virtual network interface 362 (having one IP address for virtual network interface 362) in accordance with the present invention. In the described embodiment, network interfaces 360 are Ethernet interfaces. In accordance with the present invention, bridge 342 is configured with a pass-through path 353 between port A0 and sub-port A99.0 (a description of how this configuration is accomplished is described in greater detail below). Any frames transmitted to port A0 are sent directly to sub-port A99.0 without any examination by bridge 320. Similarly, any frames transmitted to sub-port A99.0 are sent directly to port A0 without any examination by bridge 320. As used herein, tunneling is used to refer to transmitting a frame without examination. For example, when a bridge receives a frame, it generally examines the frame to determine the corresponding LAN Segment to forward the frame to. Additionally, a bridge will process the frame according to a number of protocols. However, in accordance with the present invention, bridge 342 is configured to internally transmit a frame between bridge inter-connect port 366 and port A0 directly, without such examination. Thus, port A0 on bridge 320 is slaved through sub-port A99.0 to sub-port B99.0 of bridge 344. Bridge 342 is essentially transparent to bridge 344 and host 356.

From the perspective of bridge 344, sub-port B99.0 is treated as a separate interface, and link aggregation is configured on bridge 344 for port B0 and sub-port B99.0. Additionally, from the perspective of host 356, LANs 312 and 314 are "seen" as being directly connected to bridge 344, by virtue of the pass-through path 353. Thus, in the described embodiment, there are two paths between host 356 and LAN 310, with one of the paths transparently traversing bridge 342 (e.g., via pass-through path 353).

Redundancy and Failure Recovery

With the benefits of Link Aggregation, one IP address, represented by virtual network interface 362, is associated with host 356, even though both network interfaces S0 and S1 are coupled to LAN 310. The present invention thus provides the benefit of bridge redundancy and link redundancy between host 356 and LAN 310 with host 356 seen by LAN 310 as having a single IP address via Link Aggregation. If LAN 312 and/or bridge 342 were to fail, link redundancy on host 356 would detect the failure and "shift" all communications to LAN 314 and bridge 344.

In response to the loss of LAN 314 and/or bridge 344, however, bridge 342 would reconfigure port A0 as a "normal" bridge port, discard the use of sub-port A99.0, and also begin executing Link Aggregation (i.e., port A0 would no longer be slaved through sub-port A99.0 to sub-port B99.0 of bridge 344). With the reconfiguration of port A0 as a bridge port, and without pass-through path 353, host 356 (i.e., the link aggregation on host 356) no longer sees LANs 312 and 314 as being directly coupled to bridge 344. Rather, LAN 312 would be seen as coupled to bridge 342, and LAN 314 would be seen as coupled to bridge 344, or not seen at all, depending on the extent of the failure. Host 356 (via a link redundancy protocol such as LACP or PagP) would see this as a re-connection of network interface S0 to another device, and abort the aggregation. Host 356 would then choose either LAN 312 or LAN 314 for its virtual IP interface, according to the usage of the aggregation protocol. A similar reconfiguration would occur if inter-bridge link 364 connecting bridges 342 and 344 were to fail. Because bridges 342 and 344 are able to operate independently from each other (e.g., no "learning" is required between bridges 342 and 344), host 356 can preferably remain in communication with network 310 even if inter-bridge link 364 were to fail.

In addition to the benefits of bridge redundancy and link redundancy between host 356 and LAN 310, the present invention also provides for the advantages of link redundancy in a multi-bridge configuration. In other words, even though host 356 is configured to utilize multiple network interfaces 360 in communicating with LAN 310, host 356 is preferably able to interface with LAN 310 with a single IP address as a result of virtual network interface 362 configured by link aggregation. Being associated with a single IP address provides for easier management of host 356 (and network 300), and eliminates any confusion as to which address IP address should be in communicating with host 356. Further, with link redundancy, the bandwidth between host 356 and LAN 310 is increased (e.g., doubled) since LANs 312 and 314 are able to share the load of the traffic.

Once any failures of bridge 342, bridge 344, LANs 312 and 314, and/or inter-bridge link 364 are corrected, Link Aggregation protocol would resume utilizing both bridges 342 and 344 in accordance with the present invention (e.g., bridge 342 is able to automatically reconfigure port A0 as a pass-through port once a failure on bridge 344, for example, has been corrected.) Although the present embodiment is described as including LANs 312 and 314 for use in link aggregation, it is recognized that any number of LANs (and ports and network interfaces) may be used. Additionally, the LANs may pass through any number of bridges, and in order to increase bandwidth without a corresponding increase in reliability, multiple paths may be tunneled through one bridge.

Exemplary Bridge Architecture

Figure 4:
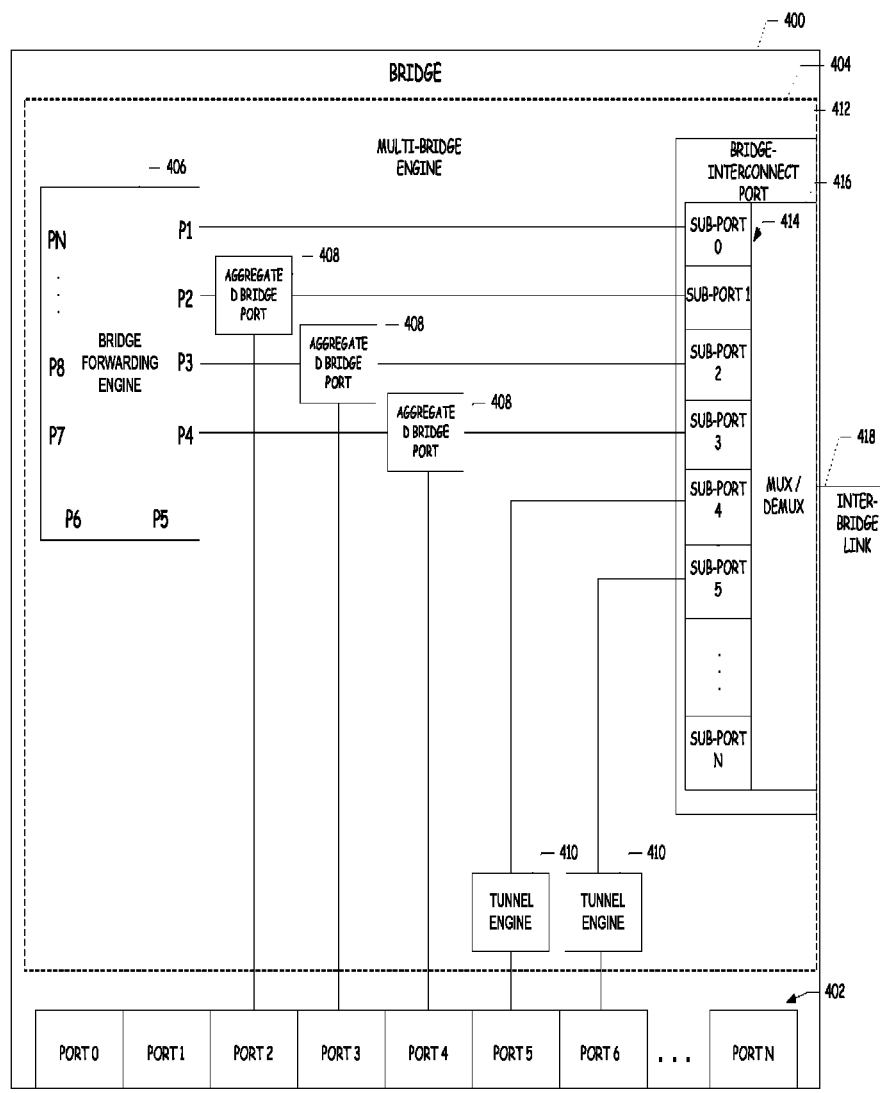
FIG. 4 is a block diagram of a bridge for use in multi-bridge LAN aggregation in accordance with the present invention.

FIG. 4 is a block diagram of a bridge 400 in accordance with one embodiment of the present invention. Bridge 400 includes ports 402 (e.g., port 0-port N) and a multi-bridge engine 404. Multi-bridge engine 404 provides forwarding and pass-through capabilities to bridge 400 which allow data to either be forwarded by bridge 400 (e.g., processing a frame received by bridge 400 according to a number of different protocols) or passed through bridge 400 (e.g., passing a frame through bridge 400 with little or no processing of the frame) in accordance with the present invention.

Multi-bridge engine 404 includes a bridge-forwarding engine 406, aggregated-bridge ports 408, tunnel engines 410, and a bridge-interconnect port 412. It will be recognized that a number of different types of mux/demux technologies may be used in the present invention. For example, Layer 3 tunnels, a number of dedicated Ethernets, and/or an array of ATM emulated LANS. Bridge-forwarding engine 406 receives data on one or more ports (e.g., P1-PN), examines the data according to a number of protocols, and forwards the data out the one or more ports P1-PN. Aggregated bridge ports 408 provide link aggregation support for bridge 400 in accordance with the present invention. Tunnel engines 410 are utilized for transparently passing data through bridge 400 (e.g., tunnel engine 410 may strip of an encapsulated header on a frame passed through bridge 400). It will be recognized that bridge forwarding engine 406, aggregated bridge ports 408, and tunnel engines 410 may be implemented in hardware or software.

Figure 5:
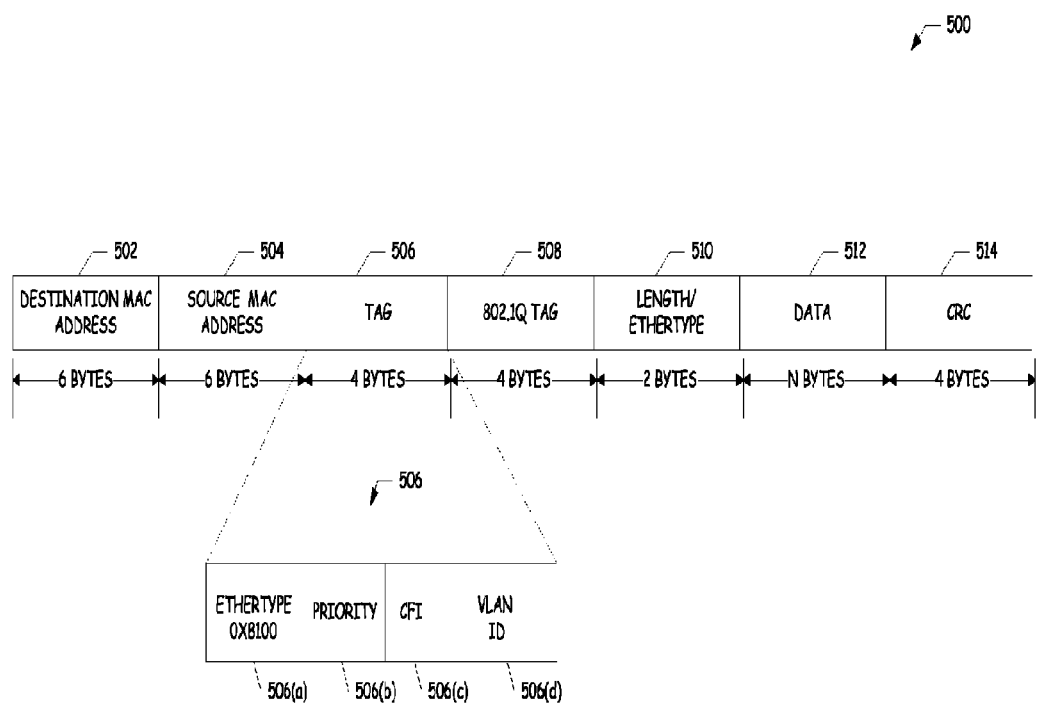
FIG. 5 is a block diagram of an encapsulated unit transmitted in multi-bridge LAN aggregation in accordance with the present invention.

Bridge-interconnect port 412 internally routes data to bridge forwarding engine 406, aggregated bridge ports 408, and/or tunnel engine 410 depending on, for example, information associated with the data (e.g., an encapsulation tag 506 such as that shown in FIG. 5). Additionally, bridge-interconnect port 412 receives data from bridge forwarding engine 406, aggregated bridge ports 408 and/or tunnel engine 410 and adds information to the data (e.g., encapsulates data with an encapsulation tag 506 such as that shown in FIG. 5). Bridge-interconnect port 412 includes sub-ports 414 (e.g., sub-port 0-sub-port N) and multiplexer/de-multiplexer 416. Sub-ports 414 allow data to be transmitted between inter-bridge link 418 and various internal objects of bridge 400 (e.g., bridge forwarding engine 406, aggregated bridge ports 408, tunnel engine 410, and/or ports 402). Multiplexer/de-multiplexer 416 provides encapsulation and de-encapsulation to frames received by bridge-interconnect port 412. Bridge 400 also includes one or more buffers (not shown) and or memory hierarchies (not shown) to temporarily store frames received on, for example, ports 402 and/or bridge-interconnect port 412.

Bridge 400 is coupled, via inter-bridge link 418, to a bridge 420 (similar to bridge 400, and not shown for simplicity of illustration). Within bridge 400, sub-port 0 is coupled to P1 of bridge forwarding engine 406. P1 represents a LAN linking bridge 400 to bridge 420. A similar configuration is provided in bridge 420. In addition, P1 is utilized to transmit a frame between bridge 400 and 420 at a periodic frequency in order for bridge 400 and 420 to detect a failure in communication (e.g., the loss of inter-bridge link 418) between bridge 400 and bridge 420. For example, in one embodiment of the present invention, bridge 400 is configured, via P1 of bridge forwarding engine 406, to transmit a keep-alive frame to bridge 420. Similarly, bridge 420 is configured to receive the keep-alive frame, and transmit the keep alive frame back to bridge 400. This process is repeated with a frequency of preferably 1 second or less. The loss of three keep-alive frames (either consecutively or within a defined time) results in a reconfiguration of bridges 400 and 420. The home bridge (which is the bridge not configured as the tunneling bridge) will consider the encapsulated link over inter-bridge link 418 as failed. The tunneling bridge will cease pass-through capabilities (but only temporarily, since automatic configuration of pass-through is possible once communication be re-established) and operate with forwarding capabilities.

Each tunneling sub-port of bridge 400 corresponds (is remoted to) an aggregated sub-port on bridge 420. Similarly, each aggregated sub-port on bride 400 corresponds (is remoted to) a tunneling sub-port on bridge 420. For example, sub-ports 1 and 3 of bridge 400 are configured to be remoted by sub-ports of bridge 420. In other words, sub-port 1 (or sub-port 2, or sub-port 3) of bridge 400 is coupled to a sub-port of bridge 420 that is configured to tunnel the frames through bridge 420. Similarly, sub-ports 4 and 5, which are configured on bridge 400 as pass-through ports via tunnel engines 410, are remoted to sub-ports of bridge 420, which, on bridge 420, are configured as aggregated bridge ports.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements of bridge 400). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Encapsulation

FIG. 5 is a block diagram of encapsulated data (e.g., Ethernet frame 500) in accordance with one embodiment of the present invention. In one embodiment of the present invention bridge-interconnect port 412 encapsulates (e.g., includes a tag within, or appended to, frame 500) and de-encapsulates (e.g., examines fields in frame 500 and/or removes tags from frame 500) frame 500 on input buffer logic (IBL) with a multi-bridge tag. It will be recognized that subtle variations of the encapsulation methods described herein may be incorporated with objects other than Ethernet frames. Further, it will be recognized that fields other than those shown in FIG. 5 may be included in, or removed from, frame 500.

In the present embodiment, frame 500 includes destination media access control (mac) address 502 and source mac address 504, representing the address of a destination host and the address of a source host of frame 500. Frame 500 also includes tags 506 and 508, length/Ethertype field 510, data field 512 and cyclical redundancy check (CRC) field 514.

Tag 506 is a multi-bridge tag preferably used to indicate the sub-port number to which frame 500 should be sent. In one embodiment of the present invention, tag 506 is a 4-byte virtual local area network (VLAN) tag as defined in IEEE std 802.1Q-1998. In one embodiment of the present invention, tag 506 includes 2-byte ethertype field 506(a), 3 bit priority field 506(b), 1 bit canonical format indicator (CFI) field 506(c), and 12-bit VLAN-ID field. It is preferable that ethertype field 506(a) be set to 0x8100 and priority field 506(b) be set according to the relative priority of the corresponding sub-port. Additionally, CFI field 506(c) is preferably set to 0 and VLAN-ID field 506(d) field is preferably used to indicate the sub-port of a bridge (e.g., bridge 400) which should transmit/receive frame 500. Although tag 506 is a VLAN tag, it is not necessary for a bridge or host to be VLAN-aware in order to process tag 506. A tag 508, optionally included in frame 500, is also preferably a VLAN tag, however the settings of tag 508 are dependent upon, inter alia, the topology of the virtual local area network.

Alternative Embodiments

Figure 6:
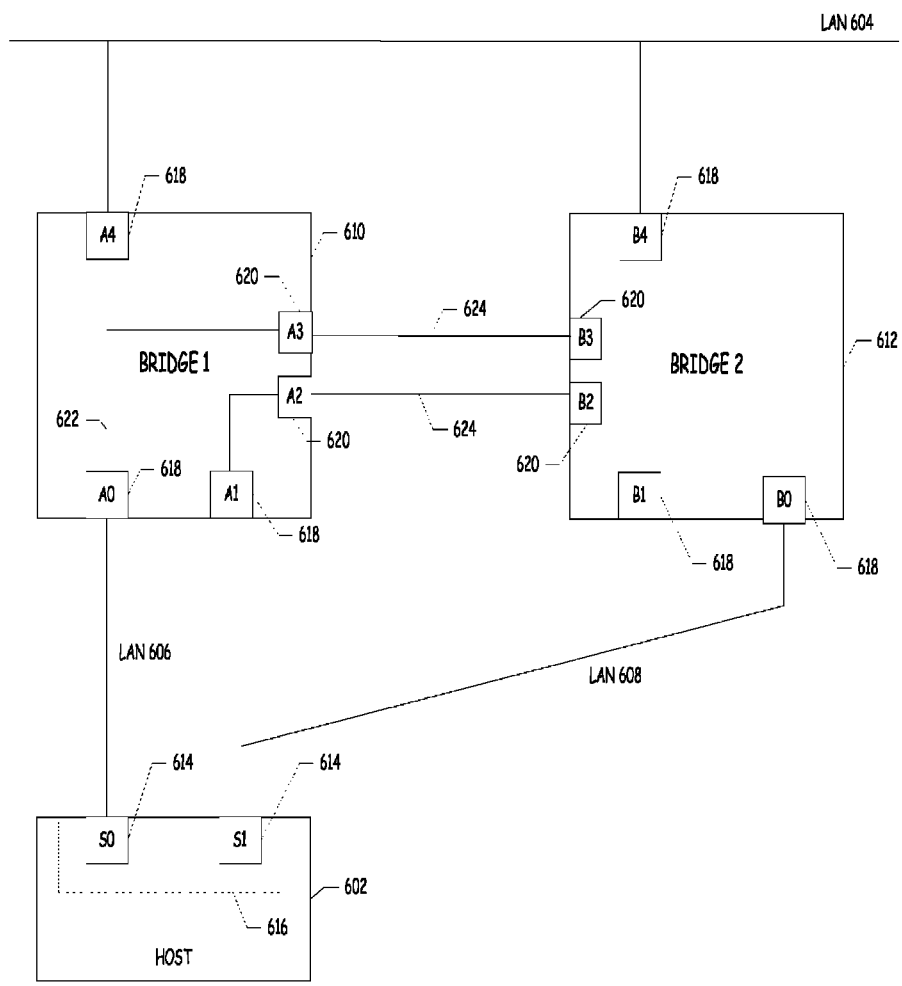
FIG. 6 is a block diagram of another embodiment of a bridge for use in multi-bridge LAN aggregation in accordance with the present invention.

FIG. 6 illustrates another embodiment of the present invention. A host 602 is coupled to a LAN 604 via LANs 606 and 608 and bridges 610 and 612. Host 602 includes a number of (e.g., 2) network interfaces 614. Together, network interfaces 614 are represented as one virtual network interface 616 (having one IP address for virtual network interface 616). Bridge 610 includes ports 618 (e.g., ports A0-A4). Bridge 612 includes ports 618 (e.g., ports B0-B4). A number of (e.g., 2) inter-bridge LANs 624 couple bridge 610 and 612 to each other via bridge ports A2-B2 and A3-B3, respectively.

Port A0 of bridge 610 is tunneled to port A3, and port A1 of bridge 610 is tunneled to port A2. In other words, bridge 610 configures ports A0 and A1 to be slaved to bridge-interconnect ports A2 and A3 and ports B2 and B3, respectively. Bridge 612 and host 602 are to aggregate LANs 606 and 608 and inter-bridge LANs 624. In other words, LANs 606 and 608 and inter-bridge LANS 624 appear as a logical LAN between bridge 612 and host 602, with bridge 610 being transparent to both bridge 612 and 602.

As can be seen from the presently described embodiment of FIG. 6, rather than utilizing, inter alia, one inter-bridge LAN between multiple bridges and a bridge interconnect port, the embodiment of FIG. 6 provides one physical connection between each port A2, A3 and B2, B3 respectively, and no encapsulation/de-encapsulation is necessary. Such a configuration may be used in a network with few hosts, making it easier to physically connect multiple ports via a number of inter-bridge LANs 624. However, for larger configurations, it is preferable to utilize the embodiment illustrated in FIG. 5, which allows for multiple bridges to be coupled with, at a minimum, one inter-bridge link (although more may be used).

Configuration and Operation

Figure 7A:
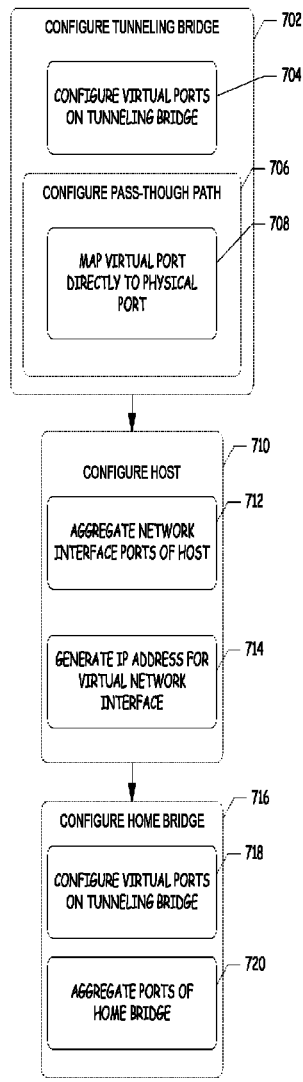
FIGS. 7(A-C) are flow charts illustrating a process of aggregating a plurality of LANs coupling a host to a first and second intermediate network device, according to one embodiment of the present invention.

FIGS. 7(A-C) are flow charts illustrating a process of aggregating a plurality of LANs coupling a host to a first and second intermediate network device, according to one embodiment of the present invention. For clarity of description, the flow charts of FIG. 7 are described with reference to FIGS. 3 and 4.

Initially, a tunneling bridge (e.g., a first intermediate device, bridge 342) is configured (step 702). The tunneling bridge is a bridge which provides a pass-through path. A tunneling bridge may also be a home bridge, which is a bridge that is configured for link aggregation with respect to a given host. To configure the tunneling bridge, the virtual ports (e.g., sub-ports 414) are configured (step 704) and a pass-through path (e.g., pass-through pass 353) is configured (step 706). In configuring the virtual ports, one or more physical ports of the tunneling bridge are mapped to a number of virtual ports. Each virtual port may then be mapped to a number of internal destinations with the tunneling bridge (e.g., bridge forwarding engine 406, aggregated bridge ports 408, or ports 402). To configure the pass-through path, a virtual port is mapped directly to another physical port of the tunneling bridge via a tunnel engine (step 708). For example, referring to FIG. 4 sub-port 4 is mapped directly to port 5 via tunnel engine 410 to provide a pass-through pass from sub-port 4 to port 5. In this configuration, a frame received by sub-port 4 will preferably be immediately transmitted directly to port 5.

A host (e.g., host 356) is configured in step 710. Initially, to configure the host, a number of network interfaces (e.g., S0 and S1) are aggregated (i.e., collectively joined or mapped) to provide a virtual network interface (e.g., network interface 362) (step 712). In one embodiment of the present invention, Link Aggregation is used for the aggregation. Next, an internet protocol (IP) address is generated for the virtual network interface (step 714). With the generated IP address, data addressed to the same IP address may be received on either network interface S0 or S1.

In step 716, the home bridge (e.g. a second intermediate device, bridge 344), is configured (as mentioned above, a home bridge can also serve as a tunneling bridge). To configure the home bridge, the virtual ports (e.g., sub-ports 414) are configured (step 718) and the ports (e.g., ports B0 and bridge-interconnect port 366) are aggregated (step 720). In one embodiment of the present invention, Link Aggregation is used for the aggregation.

As a result of the configuration of the tunneling bridge, Link Aggregation on bridge 344 sees bridge-interconnect port 366 as directly coupled to host 356, even though bridge 342 is coupled between bridge-interconnect port 366 and host 356. Similarly, Link Aggregation on host 356 sees virtual network interface 362 as directly coupled to bridge 344, even though bridge 342 is coupled between virtual network interface 362 and host 356.

FIG. 7B is a flow chart illustrating tunneling a frame from a home bridge (e.g., bridge 344) to a tunneling bridge (e.g., bridge 342), in accordance with one embodiment of the present invention. It is assumed that the destination address of the frame is the IP address corresponding to the virtual network interface of the host. Initially, when a frame is sent from the home bridge to the tunneling bridge, the frame is encapsulated (step 722). In encapsulating a frame, a tag (e.g., tag 506 of FIG. 5) is generated (step 724) and added to the frame (step 732). In the present embodiment, the tag is generated by using a IEEE Std. 802.1Q-1998. The CFI bit is set to 0, the user priority field is set to the priority of the virtual port, and the VLAN-ID field is set to the virtual port number (steps 726, 728, and 730, respectively). Once the tag is encapsulated, it is transmitted to the tunneling bridge (step 734).

The tunneling bridge de-encapsulates the frame (step 736). In de-encapsulating the frame, the virtual port number is determined (step 738) and the frame is received by the virtual port corresponding to the determined virtual port number (step 740). Next, the frame is transmitted directly to the physical port to which the virtual port is mapped (step 742) (e.g., port 5, which is mapped to sub-port 4) and the frame is then transmitted to the host (step 744). FIG. 7C is a flow chart similar to 7B, but from the perspective of transmitting a frame from a host to a home bridge (e.g., bridge 344).

As noted, FIG. 3 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   operating an intermediate network device as a tunneling network device in a link aggregation configuration, wherein
       the intermediate network device comprises
           a plurality of ports, comprising
               a first physical port, and
               a second physical port, and
           a multi-bridge engine, coupled to the plurality of ports and comprising
               a tunnel engine, and
               a bridge forwarding engine configured to process received data, received at one of the plurality of ports, according to one or more protocols,
       the second physical port is configured to support a bridge interconnect port, and
       the operating comprises
           tunneling data between the first physical port and the bridge interconnect port via the tunneling engine, wherein
               the tunneling is performed without the bridge forwarding engine processing the data according to the one or more protocols.

2. The method of claim 1, wherein the data is carried in a frame, and the tunneling comprises:
   transmitting the frame directly between the first physical port and the bridge interconnect port via the tunnel engine.

3. The method of claim 2, wherein
   encapsulating the frame with a multi-bridge tag, wherein
       the encapsulating is performed by the bridge interconnect port,
       the multi-bridge tag comprises a sub-port identifier, and
       the sub-port identifier identifies a sub-port which is to receive the frame.

4. The method of claim 1, wherein
   the plurality of ports further comprises
       a third physical port, and
   the third physical port is configured to support the bridge interconnect port.

5. The method of claim 1, wherein
   the second physical port is further configured to support another bridge interconnect port.

6. The method of claim 1, further comprising:
   mapping the first physical port as a destination of the bridge interconnect port.

7. The method of claim 6, further comprising:
   configuring the tunnel engine to perform the tunneling, wherein
       the configuring configures the tunnel engine to transmit the data directly between the first physical port and the bridge interconnect port.

8. The method of claim 1, further comprising:
   configuring the multi-bridge engine to provide forwarding functionality and pass-through functionality.

9. The method of claim 8, wherein the configuring the multi-bridge engine to provide the pass-through functionality results in the intermediate network device being configured to operate as the tunneling network device in the link aggregation configuration.

10. The method of claim 9, the configuring the multi-bridge engine to provide the pass-through functionality comprises:
    configuring a pass-through path, wherein
        the configuring the pass-through path comprises
            mapping the second physical port to a virtual port via the tunnel engine.

11. The method of claim 1, further comprising:
    configuring the intermediate network device to operate as the tunneling network device in the link aggregation configuration, wherein
        the configuring comprises
            configuring the tunnel engine to perform the tunneling of the data between the bridge interconnect port and the first physical port without the data being processed by the bridge forwarding engine.

12. The method of claim 1, further comprising:
    forwarding the received data between the one of the plurality of ports and one or more other ports of the plurality of ports, wherein
        the forwarding comprises
            processing the received data according to the one or more protocols, and the processing the received data is performed by the bridge forwarding engine.

13. The method of claim 1, further comprising:
configuring one or more virtual ports of the bridge interconnect port, wherein the configuring the one or more virtual ports comprises
   mapping the second physical port to the one or more virtual ports, and
   mapping at least one of the one or more virtual ports directly to another physical port of the plurality of ports, via a tunnel engine.

14. The method of claim 1, further comprising:
link aggregating a physical port of another intermediate network device and the bridge interconnect port; and
link aggregating a first network interface of a host and a second network interface of the host, wherein
   the first network interface is coupled to the intermediate network device, and
   the second network interface is coupled to the another intermediate network device.

15. The method of claim 14, wherein
the host comprises a virtual network interface,
the virtual network interface having an internet protocol address, and
the virtual network interface comprises the first network interface and the second network interface.

16. An intermediate network device comprising:
one or more processors;
a plurality of ports, comprising
   a first physical port, and
   a second physical port configured to be configured to support a bridge interconnect port;
a multi-bridge engine, coupled to the one or more processors and the plurality of ports, and comprising
   a tunnel engine, and
   a bridge forwarding engine configured to process received data, received at one of the plurality of ports, according to one or more protocols;
a computer-readable storage medium coupled to the one or more processors; and
a plurality of instructions, encoded in the computer-readable storage medium and configured to cause the one or more processors to
   operate the intermediate network device as a tunneling network device in a link aggregation configuration by virtue of being configured to
      cause data to be tunneled between the first physical port and the bridge interconnect port via the tunneling engine, without the bridge forwarding engine processing the data according to the one or more protocols.

17. The intermediate network device of claim 16, wherein the plurality of instructions configured to cause the one or more processors to operate the intermediate network device further comprise instructions configured to cause the one or more processors to:
map the first physical port as a destination of a bridge interconnect port;
receive a first frame via the first physical port; and
in response to the intermediate network device operating as a tunneling network device in the link aggregation configuration when the first frame is received, tunnel the first frame from the first physical port to a second physical port without the first frame being processed by the bridge forwarding engine.

18. The intermediate network device of claim 17, wherein the plurality of instructions configured to cause the one or more processors to operate the intermediate network device further comprise instructions configured to cause the one or more processors to:
receiving a second frame via the second physical port; and
in response to the intermediate network device operating as the tunneling network device in the link aggregation configuration when the second frame is received, tunneling the second frame from the second physical port to the first physical port without the second frame being processed by the bridge forwarding engine.

19. The intermediate network device of claim 16, wherein the intermediate network device is configured to be coupled to:
a second intermediate network device, wherein
   the second intermediate network device and the intermediate network device are coupled to one another via an inter-bridge link; and
a host, wherein
   a first network interface of the host is coupled to the intermediate network device via a first LAN,
   a second network interface of the host is coupled to the second intermediate network device via a second LAN, and
   the host comprises a virtual network interface comprises the first network interface and the second network interface.

20. An intermediate network device comprising:
a plurality of ports, comprising
   a first physical port, and
   a second physical port configured to be configured to support a bridge interconnect port; and
multi-bridge engine means for operating the intermediate network device as a tunneling network device in a link aggregation configuration, wherein
   the multi-bridge engine means is coupled to the plurality of ports and comprises
      bridge forwarding engine means for processing received data, received at one of the plurality of ports, according to one or more protocols, and
      tunnel engine means for tunneling data between the first physical port and the bridge interconnect port, when the intermediate network device is operating as a tunneling network device in a link aggregation configuration, wherein
         the tunnel engine means is configured to perform the tunneling the data without the data being processed by the bridge forwarding engine means according to the one or more protocols.

* * * * *